(12) United States Patent
Fujiwara et al.

(10) Patent No.: US 9,378,193 B2
(45) Date of Patent: Jun. 28, 2016

(54) WEB MANAGEMENT DEVICE, WEB MANAGEMENT METHOD, WEB MANAGEMENT PROGRAM, COMPUTER READABLE RECORDING MEDIUM FOR RECORDING SAID PROGRAM, AND WEB SYSTEM

(75) Inventors: Yusuke Fujiwara, Shinagawa-ku (JP); Soh Masuko, Shinagawa-ku (JP); Shigaku Iwabuchi, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 102 days.

(21) Appl. No.: 13/810,803

(22) PCT Filed: Jun. 28, 2011

(86) PCT No.: PCT/JP2011/064818
§ 371 (c)(1),
(2), (4) Date: Jan. 17, 2013

(87) PCT Pub. No.: WO2012/023346
PCT Pub. Date: Feb. 23, 2012

(65) Prior Publication Data
US 2013/0318431 A1    Nov. 28, 2013

(30) Foreign Application Priority Data

Aug. 16, 2010 (JP) ................................ 2010-181820
Sep. 15, 2010 (JP) ................................ 2010-207054

(51) Int. Cl.
*G06F 17/00* (2006.01)
*G06F 17/22* (2006.01)
(Continued)

(52) U.S. Cl.
CPC .......... *G06F 17/2247* (2013.01); *G06F 3/0481* (2013.01); *G06F 3/0488* (2013.01); *G06F 3/04886* (2013.01); *G06F 13/00* (2013.01)

(58) Field of Classification Search
CPC .................................................. G06F 3/0488
USPC .......... 715/234, 200, 863, 243, 785–786, 862
See application file for complete search history.

(56) References Cited

U.S. PATENT DOCUMENTS 6,300,947 B1 * 10/2001 Kanevsky ..................... 715/866
6,593,944 B1 *  7/2003 Nicolas et al. ................ 715/744
(Continued)

FOREIGN PATENT DOCUMENTS

CN    101183292 A    5/2008
EP      1923778 A2    5/2008
(Continued)

OTHER PUBLICATIONS sitepen, Touching and Gesturing on the iPhone, published 2008, sitepen.com, pp. 1-6 (pdf).*

(Continued)

*Primary Examiner* — Manglesh M Patel
(74) *Attorney, Agent, or Firm* — Sughrue Mion, PLLC

(57) ABSTRACT

A web management device is capable of displaying a web page containing an object in a display area of an input device having the display area and detecting physical contact with the display area. The device includes a generating means for generating the web page with an embedded detectable range for acquiring a position of physical contact with the object displayed in the display area, an acquiring means for acquiring a position of physical contact made within the detectable range of the web page generated and displayed in the display area as a selected position of the object corresponding to the range and acquiring position information indicating the selected position, a storing means for storing the acquired position information, and an adjusting means for compiling the stored position information and adjusting a display target in the display area based on the compiled position information.

17 Claims, 23 Drawing Sheets

(51) Int. Cl.
  *G06F 3/0488* (2013.01)
  *G06F 13/00* (2006.01)
  *G06F 3/0481* (2013.01)

(56) References Cited

U.S. PATENT DOCUMENTS

| | | | |
|---|---|---|---|
| 7,596,760 B2* | 9/2009 | Sauve | G06F 3/0481 715/234 |
| 7,812,826 B2* | 10/2010 | Ording et al. | 345/173 |
| 7,940,250 B2* | 5/2011 | Forstall | 345/173 |
| 7,986,309 B2* | 7/2011 | Kim | 345/173 |
| 8,294,669 B2* | 10/2012 | Partridge et al. | 345/157 |
| 8,307,300 B1* | 11/2012 | Fisher et al. | 715/800 |
| 8,359,552 B2 | 1/2013 | Suzuki et al. | |
| 8,375,321 B2* | 2/2013 | Cruz Moreno | G06F 17/30899 715/777 |
| 8,381,125 B2* | 2/2013 | Leffert et al. | 715/800 |
| 8,434,003 B2* | 4/2013 | Zalewski | G06F 1/1626 715/700 |
| 8,504,946 B2* | 8/2013 | Williamson et al. | 715/863 |
| 8,533,580 B1* | 9/2013 | Xu | 715/205 |
| 8,612,884 B2* | 12/2013 | Capela et al. | 715/800 |
| 8,619,038 B2* | 12/2013 | Chaudhri et al. | 345/173 |
| 8,627,195 B1* | 1/2014 | Hayden | 715/229 |
| 8,631,340 B2* | 1/2014 | Schreiner | G06F 3/0483 439/152 |
| 8,683,319 B2* | 3/2014 | Yuan | G06F 17/30902 715/234 |
| 8,819,560 B2* | 8/2014 | Ortwein | G06F 9/542 715/207 |
| 9,164,670 B2* | 10/2015 | Lobo | G06F 3/0485 |
| 2004/0223004 A1 | 11/2004 | Lincke et al. | |
| 2007/0152984 A1 | 7/2007 | Ording et al. | |
| 2007/0250618 A1 | 10/2007 | Hammond | |
| 2009/0006938 A1* | 1/2009 | Yoo et al. | 715/205 |
| 2009/0158190 A1 | 6/2009 | Higginson | |
| 2009/0158200 A1 | 6/2009 | Palahnuk et al. | |
| 2009/0225037 A1* | 9/2009 | Williamson et al. | 345/173 |
| 2010/0031185 A1* | 2/2010 | Wilson | G06F 17/30905 715/777 |
| 2010/0064250 A1* | 3/2010 | Schroeder | G06F 3/0485 715/784 |
| 2010/0115610 A1 | 5/2010 | Tredoux | |
| 2010/0199195 A1 | 8/2010 | Carounanidy et al. | |
| 2010/0269069 A1 | 10/2010 | Paila et al. | |
| 2011/0086706 A1* | 4/2011 | Zalewski | A63F 13/06 463/36 |
| 2011/0102455 A1* | 5/2011 | Temple | 345/619 |
| 2012/0166987 A1* | 6/2012 | Kang et al. | 715/765 |
| 2012/0242684 A1 | 9/2012 | Kim | |
| 2014/0337709 A1* | 11/2014 | Choi | G06F 17/2247 715/234 |
| 2014/0351721 A1* | 11/2014 | DeLuca | G06F 3/0481 715/760 |
| 2015/0121194 A1* | 4/2015 | Patten | G06F 3/0483 715/234 |

FOREIGN PATENT DOCUMENTS

| | | |
|---|---|---|
| JP | 05-165570 A | 7/1993 |
| JP | 2000-231446 A | 8/2000 |
| JP | 2000-298542 A | 10/2000 |
| JP | 2000-330854 A | 11/2000 |
| JP | 2000-352010 A | 12/2002 |
| JP | 2005-266945 A | 9/2005 |
| JP | 2009-536760 A | 10/2009 |
| JP | 2010-102465 A | 5/2010 |
| JP | 2010-266513 A | 11/2010 |
| JP | 2009-187311 A | 2/2011 |
| KR | 10-2010-0040844 A | 4/2010 |
| WO | 2007014064 A2 | 2/2007 |
| WO | 2010074868 A1 | 7/2010 |

OTHER PUBLICATIONS

Notice of Decision to Grant a Patent issued in Japanese Patent Application No. 2012-518647 dated Jun. 26, 2012.
English Translation of the International Preliminary Report on Patentability issued on Mar. 28, 2013 in corresponding Japanese Patent Application PCT/JP2011/064818.
Canadian Office Action issued May 30, 2013 in corresponding Canadian patent application No. 2,802,648.
Korean Patent Office, Korean Office Action issued in corresponding KR Application No. 10-2013-7002080, dated Sep. 27, 2013.
iGOOGLE, [online], [Searched on Aug. 23, 2010], Internet (URL: http://www.google.co.jp.ig).
International Search Report of PCT/JP2011/064818 dated Oct. 4, 2011.
Canadian Office Action dated May 14, 2014 issued on corresponding Canadian Patent Application No. 2,802,648.
European Search Report dated Mar. 27, 2014, issued in European Patent Application No. 11817993.6.

* cited by examiner

Fig.8

| CONDITIONS RELATED TO OPERATION INFORMATION | WEB PAGE DISPLAY MODE |
|---|---|
| RIGHT-HAND OPERATION TENDENCY | PATTERN 1 |
| LEFT-HAND OPERATION TENDENCY | PATTERN 2 |
| FREQUENT SCALING OPERATION | PATTERN 3 |
| ⋮ | ⋮ |

WEB MANAGEMENT DEVICE, WEB MANAGEMENT METHOD, WEB MANAGEMENT PROGRAM, COMPUTER READABLE RECORDING MEDIUM FOR RECORDING SAID PROGRAM, AND WEB SYSTEM

CROSS REFERENCE TO RELATED APPLICATIONS

This application is a National Stage of International Application No. PCT/JP2011/064818 filed Jun. 28, 2011, claiming priority based on Japanese Patent Application Nos. 2010-181820 filed Aug. 16, 2010 and JP 2010-207054 filed Sep. 15, 2010, the contents of all of which are incorporated herein by reference in their entirety.

TECHNICAL FIELD

The present invention relates to a web management device, a web management method, a web management program, a computer readable recording medium for recording the program, and a web system.

BACKGROUND ART

Techniques of analyzing an operation on a web page have been known hitherto. For example, a tool that makes independent analysis of an ActionScript application is disclosed in Patent Literature 1 below. Further, a service that allows a user to freely place desired contents in desired positions on a web page provided to the user is disclosed in Non Patent Literature 1.

CITATION LIST

Patent Literature

PTL 1: Japanese Unexamined Patent Application Publication (Translation of PCT application) No. 2009-536760

Non Patent Literature

NPL 1: iGoogle, [online], [Searched on Aug. 23, 2010], Internet.

SUMMARY OF INVENTION

Technical Problem

As a device for displaying a web page, a small terminal called a tablet machine has come on the market and become widespread recently. With the widespread of the tablet machine, web page design is changing. For example, for easier touching on a small screen, a link that has been displayed in text is increasingly replaced by a selectable image object such as a banner or icon. In order to accurately analyze an operation on a web page in accordance with the transition of the display device and the change in the mode of representation, it is necessary to make changes to the analysis method. Further, there are various ways of user's operation on the tablet machine or the like, and it is thus necessary to accurately analyze the tendency of the user's operation and provide a user interface suitable for the user.

In light of the foregoing, an object of the present invention is to provide a web management device, a web management method, a web management program, a computer readable recording medium for recording the program, and a web system that can accurately grasp the mode of operation on a web page in a terminal that receives a touch input and provide a user interface suitable for the tendency of the user's operation.

Solution to Problem

To solve the above problem, a web management device according to the present invention is a web management device capable of displaying a web page containing an object in a display area of an input device having the display area and detecting physical contact with the display area, the device including a generating means for generating the web page with an embedded detectable range for acquiring a position of physical contact with the object displayed in the display area, an acquiring means for acquiring a position of physical contact made within the detectable range of the web page generated by the generating means and displayed in the display area as a selected position of the object corresponding to the range, and acquiring position information indicating the selected position, a storing means for storing the position information acquired by the acquiring means, and an adjusting means for compiling the position information stored in the storing means and adjusting a display target in the display area based on the compiled position information.

A web management method according to the present invention is a web management method executed by a web management device capable of displaying a web page containing an object in a display area of an input device having the display area and detecting physical contact with the display area, the method including a generating step of generating the web page with an embedded detectable range for acquiring a position of physical contact with the object displayed in the display area, an acquiring step of acquiring a position of physical contact made within the detectable range of the web page generated in the generating step and displayed in the display area as a selected position of the object corresponding to the range, and acquiring position information indicating the selected position, a storing step of storing the position information acquired in the acquiring step, and an adjusting step of compiling the position information stored in the storing step and adjusting a display target in the display area based on the compiled position information.

A web management program according to the present invention is a web management program causing a computer to function as a web management device capable of displaying a web page containing an object in a display area of an input device having the display area and detecting physical contact with the display area, the program causing the computer to implement a generating function for generating the web page with an embedded detectable range for acquiring a position of physical contact with the object displayed in the display area, an acquiring function for acquiring a position of physical contact made within the detectable range of the web page generated by the generating function and displayed in the display area as a selected position of the object corresponding to the range, and acquiring position information indicating the selected position, a storing function for storing the position information acquired by the acquiring function, and an adjusting function for compiling the position information stored in the storing function and adjusting a display target in the display area based on the compiled position information.

A computer readable recording medium according to the present invention is a computer readable recording medium for recording a web management program causing a computer to function as a web management device capable of displaying a web page containing an object in a display area of an input device having the display area and detecting physical contact with the display area, the web management program causing the computer to implement a generating function for generating the web page with an embedded detectable range for acquiring a position of physical contact with the object displayed in the display area, an acquiring function for acquiring a position of physical contact made within the detectable range of the web page generated by the generating function and displayed in the display area as a selected position of the object corresponding to the range, and acquiring position information indicating the selected position, a storing function for storing the position information acquired by the acquiring function, and an adjusting function for compiling the position information stored in the storing function and adjusting a display target in the display area based on the compiled position information.

A web system according to the present invention is a web system including a terminal having an input device for displaying a web page containing an object in a display area and detecting physical contact with the display area, and a web server capable of communicating with the terminal, the web server including a generating means for generating the web page with an embedded detectable range for acquiring a position of physical contact with the object displayed in the display area, a transmitting means for transmitting the web page generated by the generating means to the terminal, an acquiring means for acquiring position information indicating a selected position from the terminal having displayed the web page transmitted by the transmitting means in the display area and acquired a position of physical contact made within the detectable range of the web page as the selected position of the object corresponding to the range, a storing means for storing the position information acquired by the acquiring means, and an adjusting means for compiling the position information stored in the storing means and adjusting a display target in the display area based on the compiled position information.

According to the above-described invention, the detectable range for detecting the position of physical contact with an object is embedded in a web page and displayed in the display area. After that, when physical contact occurs within the detectable range, the contact position is acquired as the selected position (position information) of the object and stored. Then, the obtained information is compiled, and a display target in the display area is adjusted based on the compiled information. In this manner, by collecting not only information that an object is selected but also information as to at which position the selection of the object is made, the mode of operation on the object in the web page can be acquired in detail, and the display target can be adjusted based on the mode of operation. As a result, it is possible to accurately grasp the mode of operation on the web page in the terminal that receives a touch input and provide the web page suitable for the tendency of the user's operation.

In the web management device according to the present invention, the acquiring means may acquire operation information indicating an operation by a user on a first web page displayed in the display area based on the position information, the storing means may store the operation information acquired by the acquiring means, and the adjusting means may adjust a second web page to be displayed in the display area based on the operation information stored in the storing means.

According to the present invention, the operation information indicating an operation by a user on the first web page is acquired, and the web page to be displayed in the display area is adjusted based on the acquired operation information. Then, the adjusted second web page is displayed in the display area. Because the web page is adjusted in this manner, the tendency of the user's operation is reflected on the web page. It is thus possible to provide the web page suitable for the tendency of the user's operation.

In the web management device according to the present invention, the detectable range may be composed of a region of the corresponding object and a peripheral region of the region.

In this case, because the detectable range is set also on the periphery of the object, physical contact not only within the region of the object but also in the vicinity thereof is obtained. Because more position information is thereby obtained, it is possible to grasp the mode of operation on the object in further detail.

In the web management device according to the present invention, a link to another web page may be embedded in both of the object and the peripheral region.

In this case, because switching of web pages is made even when physical contact occurs not on the object itself but in the vicinity thereof, the convenience of the web page is enhanced.

In the web management device according to the present invention, an outer edge of the object may be a margin.

In the web management device according to the present invention, the selected position may be represented by two-dimensional coordinates. By obtaining the selected position using the two-dimensional coordinates, the mode of operation can be grasped in detail.

In the web management device according to the present invention, the object may be virtually divided into a plurality of blocks, and the selected position may be represented by an identifier of the block. By obtaining the selected position using the identifier of the block, the tendency of the mode of operation can be easily grasped.

In the web management device according to the present invention, the object may contain a character, a virtual region may be set in the object for each region where a character, a phase composed of a plurality of characters, or a sentence is displayed, and the selected position may be represented by an identifier indicating the virtual region. By obtaining the selected position for each virtual region where a character or the like is displayed, the tendency of the mode of operation with respect to the operation position on the object can be easily grasped.

In the web management device according to the present invention, the input device may be a touch panel.

In the web management device according to the present invention, the operation information may contain information related to a selected position in a region where selection made on an object displayed on the first web page is detectable, and the adjusting means may adjust layout of objects contained in the second web page based on the information related to the selected position.

At the time when a user selects an object displayed in the display area, a certain tendency appears in the selected position of the object due to the way the user holds or operates a device including an input device. In the web management device having the above feature, the web page to be displayed in the display area is adjusted based on information about the selected position, and therefore the tendency on the basis of the way the user holds or operates the device is reflected on the web page. It is thus possible to provide the web page suitable for the tendency of the user's operation.

In the web management device according to the present invention, the operation information may contain information related to deviation of a selected position in the region where selection made on the object is detectable, and the adjusting means may place selectable objects contained in the second web page in a specified region set in accordance with a direction of the deviation in the display area.

In this case, because the information related to deviation of the selected position in the region where selection made on the object is detectable is acquired, the tendency of the selected position can be appropriately acquired. Further, because objects contained in the web page to be displayed in the display area are placed in a specified region in accordance with the direction of the deviation based on that information, it is possible to make adjustment of the web page suitable for the tendency of the user's operation.

In the web management device according to the present invention, the operation information may contain information related to changing of a display size of the first web page, and the adjusting means may adjust a display size of the second web page based on the information related to changing of the display size.

In this case, because the display size of the web page to be displayed in the display area is adjusted based on information about the changing of the display size of the web page by a user, it is possible to reflect the display size of the web page desired by a user in advance at the time of displaying the web page in the display area.

In the web management device according to the present invention, the adjusting means may partially adjust a display size of selectable objects in the second web page. In this case, it is possible to provide a web page that allows easy selection.

The web management device according to the present invention may further include a web page storing means storing different display modes related to the second web page in association with conditions related to the operation information, and the adjusting means may extract a display mode of the second web page associated with the operation information stored in the storing means as a display mode of the second web page to be displayed in the display area from the web page storing means.

In this case, because the adjusted display modes are stored in advance for each of the conditions related to the operation information, the display mode associated with the operation information is extracted based on the acquired operation information, and the web page in the extracted display mode is displayed in the display area, it is possible to easily provide a web page that is adjusted to be suitable for the tendency of the user's operation.

In the web management device according to the present invention, the operation information may contain information related to scrolling of the first web page, and the adjusting means may adjust an attribute value related to an amount of movement of display contents with respect to the scrolling in the second web page.

In this case, because an attribute value related to the amount of movement of the display contents with respect to the scrolling of the web page to be displayed in the display area is adjusted based on information about the scrolling of the web page by a user, it is possible to reflect the tendency of the scrolling desired by a user in advance at the time of displaying the web page in the display area.

In the web management device according to the present invention, the storing means may store the operation information on a user-by-user basis, and the adjusting means may adjust the second web page on a user-by-user basis. In this case, it is possible to provide a web page suitable for the tendency of the user's operation.

Advantageous Effects of Invention

According to the present invention, because not only information that an object is selected but also information as to at which position the selection of the object is made is collected, it is possible to accurately grasp the mode of operation on a web page in a terminal that receives a touch input and provide a web page suitable for the tendency of the user's operation.

BRIEF DESCRIPTION OF DRAWINGS

FIG. 8 is a diagram showing a configuration of a web page storing unit and data stored therein.

DESCRIPTION OF EMBODIMENTS

Embodiments of the present invention are described hereinafter in detail with reference to the appended drawings. In the description of the drawings, the same or equivalent elements are denoted by the same reference symbols, and the redundant explanation thereof is omitted.

First Embodiment

Figure 1:
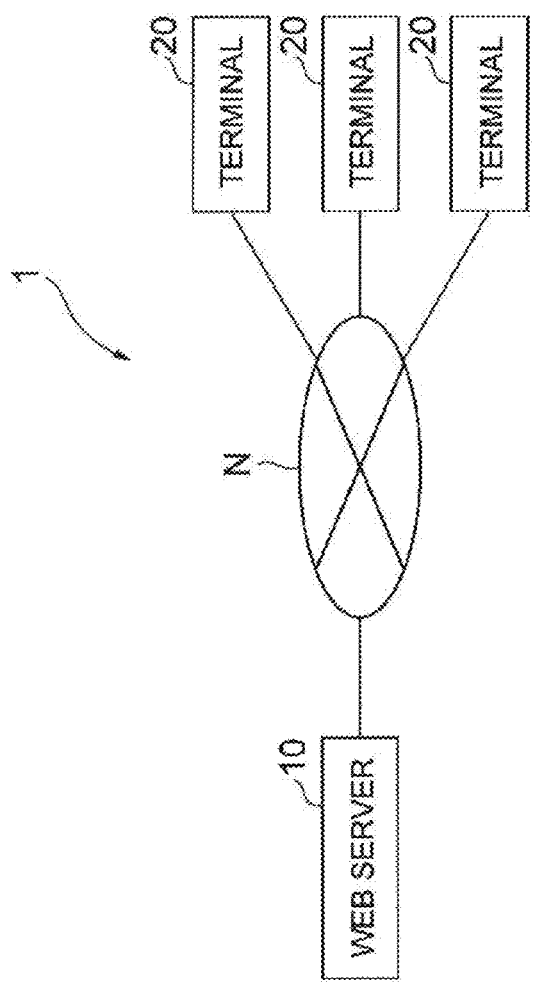
FIG. 1 is a diagram showing a device configuration of a web system.

FIG. 1 is a block diagram showing a device configuration of a web system 1 according to this embodiment. The web system 1 is a computer system that provides a web page to a user. The web system 1 includes a web server 10 that provides a web page and a terminal 20 that is owned by a user. The web server 10 and the terminal 20 can communicate with each other through a communication network N that is the Internet, a wireless LAN, a mobile communication network or the like. Although three terminals 20 are shown in FIG. 1, the number of terminals in the web system 1 is arbitrary.

Figure 2:
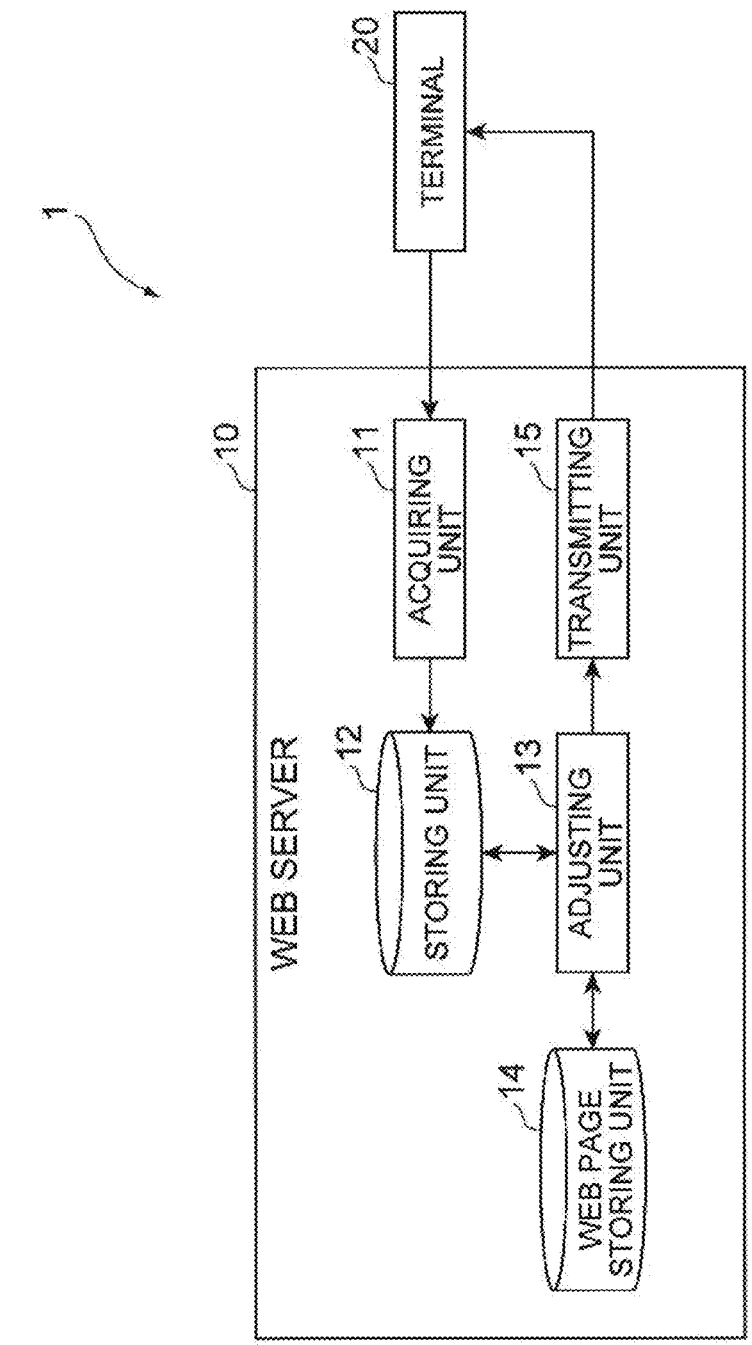
FIG. 2 is a block diagram showing a functional configuration of a web server according to a first embodiment.

FIG. 2 is a block diagram showing a functional configuration of the web server 10 according to this embodiment. As shown in FIG. 2, the web server 10 includes, as functional components, an acquiring unit 11 (acquiring means), a storing unit 12 (storing means), an adjusting unit 13 (adjusting means), and a transmitting unit 15. The web server 10 may further include a web page storing unit 14 (web page storing means). Note that, although the functional units 11 to 15 are incorporated in one device in this embodiment, the functional units 11 to 15 may be incorporated in separate devices that can communicate with one another. The web server 10 according to the first embodiment serves as the web management device according to the present invention.

Figure 3:
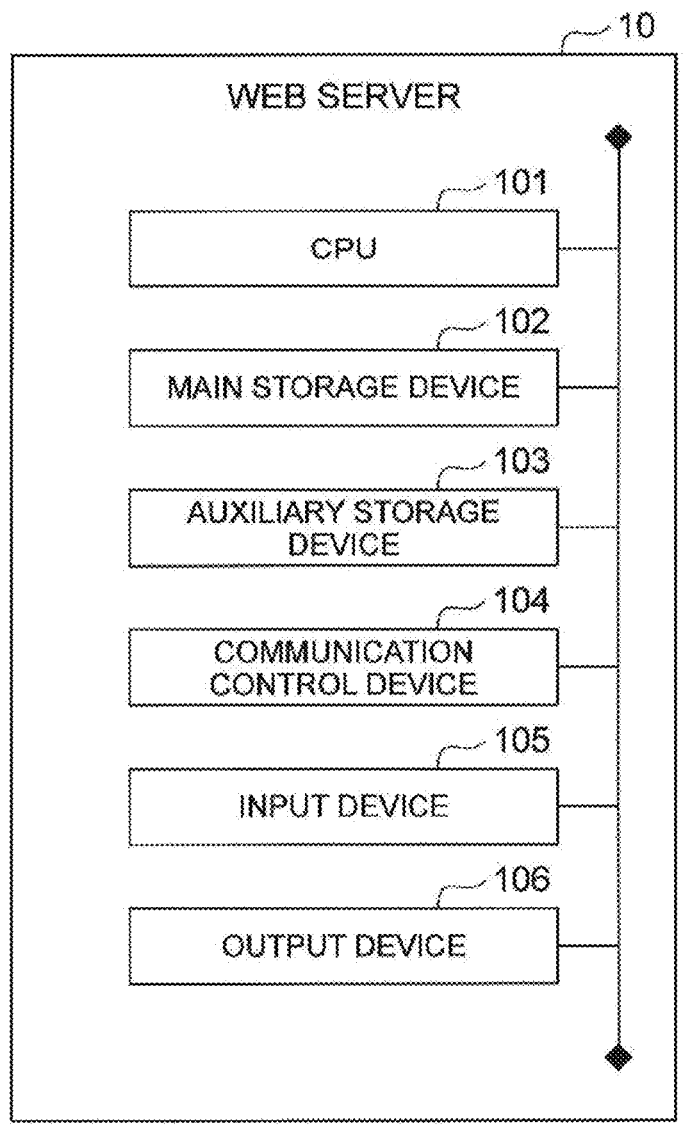
FIG. 3 is a diagram showing a hardware configuration of the web server shown in FIG. 1.

FIG. 3 is a hardware configuration diagram of the web server 10. As shown in FIG. 3, the web server 10 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 2 are implemented by loading given computer software onto hardware such as the CPU 101 or the main storage device 102, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

Figure 4:
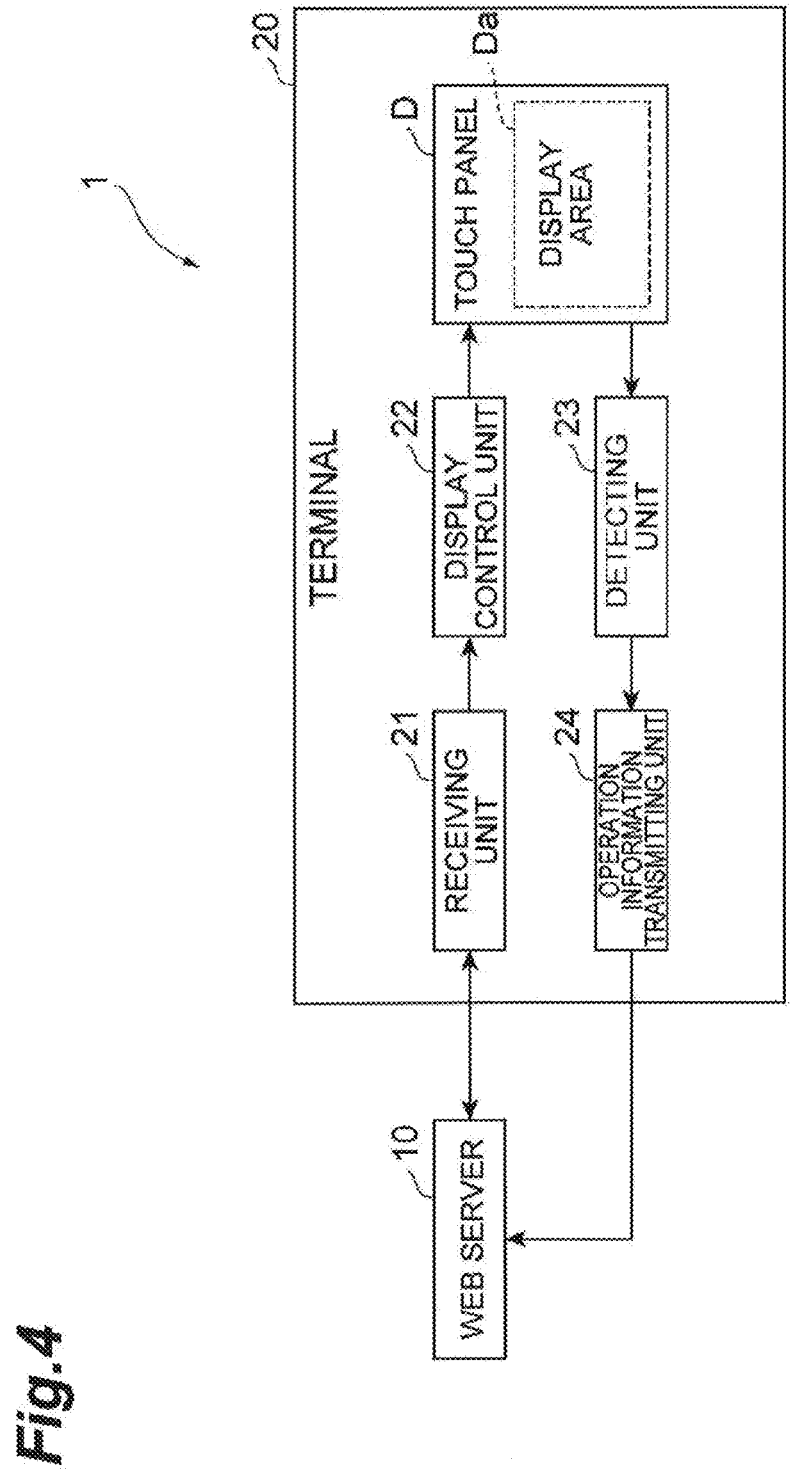
FIG. 4 is a block diagram showing a functional configuration of a terminal according to the first embodiment.

FIG. 4 is a block diagram showing a functional configuration of the terminal 20. The terminal 20 has a touch panel D and includes a receiving unit 21, a display control unit 22, a detecting unit 23 and an operation information transmitting unit 24 as functional components. One example of the terminal 20 is a tablet machine; however, the type of the terminal is not particularly limited as long as it is a communication device having the touch panel D. The terminal may be mobile or stationary. Prior to describing the web server 10, the functional units of the terminal 20 are described in detail below.

The touch panel D is an input device that has a display area Da and displays various kinds of information on the display area Da and further detects physical contact with the display area Da. An example of the physical contact includes tapping by a pointing device such as a touch pen, a finger or the like. The touch panel D acquires various types of user's operations based on the detected physical contact. In this embodiment, the display area Da displays a web page, for example.

The receiving unit 21 is a part that receives a web page to be displayed in the display area Da of the touch panel D. The web page is transmitted from the web server 10 to the terminal 20 in response to a request from the terminal 20. The request for a web page is transmitted from the terminal 20 to the web server 10 based on selection of a link contained in a web page being displayed or another specified operation. The functions of detecting and transmitting a request for a web page may be implemented by the receiving unit 21 or another functional unit which is not shown. The receiving unit 21 transmits the received web page to the display control unit 22.

The display control unit 22 is a means of controlling display so that the web page that is input from the receiving unit 21 is displayed on the touch panel D. The web page is thereby displayed in the display area Da of the touch panel D.

The detecting unit 23 is a part that detects a user's operation on a first web page that is displayed in the display area Da based on physical contact with the display area Da. Note that, in this embodiment, the first web page is a web page that is being displayed in the display area Da, on which various types of user's operations are made. The user's operations on the web page include selection of an object displayed on the web page, changing of the display size of the web page, and scrolling of the web page.

The selection of an object displayed on the web page is detected when physical contact by a user's finger or another device is detected without accompanying a change in contact position in a specified detectable region that is set for the object in the display area Da, for example. Further, the detecting unit 23 acquires the coordinates of the selected position at the time of detecting the selection. The coordinates of the selected position may be any of the coordinates in the coordinate system that is set in the display area Da, the coordinates in the coordinate system that is set in a display range of the first web page and the coordinates in the coordinate system that is set in a region in which an object is displayed, for example.

Figure 5:
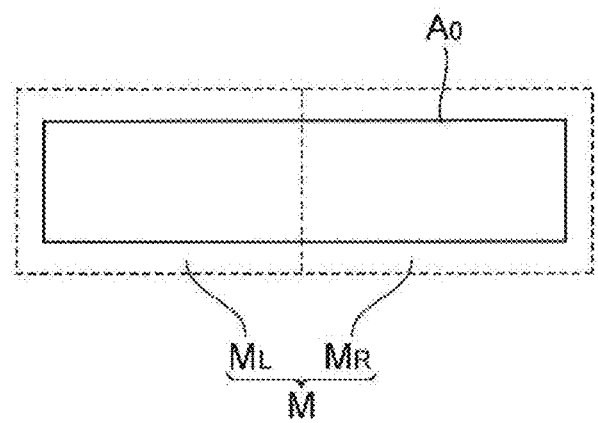
FIG. 5 is a diagram showing setting of a range where selection of an object displayed in a display area is detectable.

Further, the detecting unit 23 can detect information such as which one of a plurality of specified regions that are set in a region where selection of an object is detectable. The detection processing is described with reference to FIG. 5. FIG. 5 is a diagram showing an example of setting of a range where selection of an object $A_O$ that is displayed in the display area Da is detectable. In the object $A_O$, a region M in which selection is detectable when displayed by being contained in a web page is set. In this embodiment, the region M in which selection is detectable is divided into a left-hand region $M_L$ and a right-hand region $M_R$ on the border of the near center in the horizontal direction of the object, for example. The detecting unit 23 can detect information such as which of the left-hand region $M_L$ and the right-hand region $M_R$ the selected position belongs to based on the coordinates of the selected position. The detecting unit 23 can thereby detect that selection has been made in a region which is deviated to the left or right of the region M in which selection of the object is detectable. Note that, although the detecting unit 23 detects that selection has been made in a region which is deviated to the left or right of the region M in which selection is detectable, it is not limited thereto, and the detecting unit 23 may detect the up or down deviation of the selected position or detect both of the left or right deviation and the up or down deviation. The detecting unit 23 transmits information about the type of operation such as selection and at least one of the coordinates of the selected position and information about the deviation of the selected position to the operation information transmitting unit 24. Note that the coordinates of the selected position and the information about the display position of the object may be transmitted to the web server 10 through the operation information transmitting unit 24, and the web server 10 may perform the detection of the deviation of the selected position.

The coordinates of the selected position and various events on the touch panel D can be acquired by API (Application Programming Interface) specific to the terminal 20 or JavaScript (registered trademark), for example.

The changing of the display size of a web page is detected when a specified operation for changing the display size of a web page by a user's finger or another device is detected. For example, the scaling-up of the display size is detected when a user brings two fingers into contact with the touch panel D and moves the two fingers in the direction of separating the contact positions from each other, and the scaling-down of the display size is detected when a user moves the two fingers in the direction of making the contact positions closer to each other. The detecting unit 23 transmits information about the type of operation such as the scaling-up or scaling-up of the display size to the operation information transmitting unit 24. Note that a plurality of time-series coordinate values at the time when a specified operation is performed may be transmitted to the web server 10, and the web server 10 may detect that changing of the display size has been made.

The scrolling of a web page is detected when physical contact by a user's finger or another device is detected accompanying the movement of the contact position in a specified detectable region that is set for the object in the display area Da, for example. Further, information indicating the moving speed of the contact position may be detected at the same time. The detecting unit 23 transmits information about the detected scrolling to the operation information transmitting unit 24. Note that a plurality of time-series coordinate values at the time when the scrolling is performed may be transmitted to the web server 10, and the web server 10 may detect that scrolling has been made.

The operation information transmitting unit 24 is a part that transmits operation information indicating the user's operation that is detected by the detecting unit 23 to the web server 10. Hereinafter, the functional units of the web server 10 are described in detail with reference back to FIG. 2.

The acquiring unit 11 is a part that acquires operation information indicating the user's operation on the first web page that is displayed in the display area Da of the terminal 20 which is transmitted from the terminal 20. The acquiring unit 11 stores the acquired operation information into the storing unit 12. The storing unit 12 is a storing means that stores the operation information. Note that the acquiring unit 11 can acquire the operation information for each user of the terminal 20 and store the acquired operation information into the storing unit 12 for each user. In this case, the storing unit 12 stores the operation information for each user of the terminal 20.

The adjusting unit 13 is a part that adjusts the second web page which is a display target in the display area Da based on the operation information stored in the storing unit 12. Note that the adjusting unit 13 performs adjustment of the second web page for each user of the terminal 20.

Note that, in this embodiment, the second web page is a web page that is transmitted to the terminal 20 in response to a request from the terminal 20 and displayed in the display area Da of the terminal 20. The second web page is a web page that is different from the first web page, for example. As an example of such a case, it is assumed where, in the state where a link to the second web page is contained in the first web page and the first web page is displayed in the display area Da, the second web page is to be displayed in the display area Da by the selection of the link. Further, the second web page may be a web page that contains the same object as the first web page, for example. As an example of such a case, it is assumed where, after the first web page is displayed in the display area Da, a request for the web page is transmitted from the terminal 20 to the web server 10, and the web page is to be displayed again in the display area Da.

Figure 6:
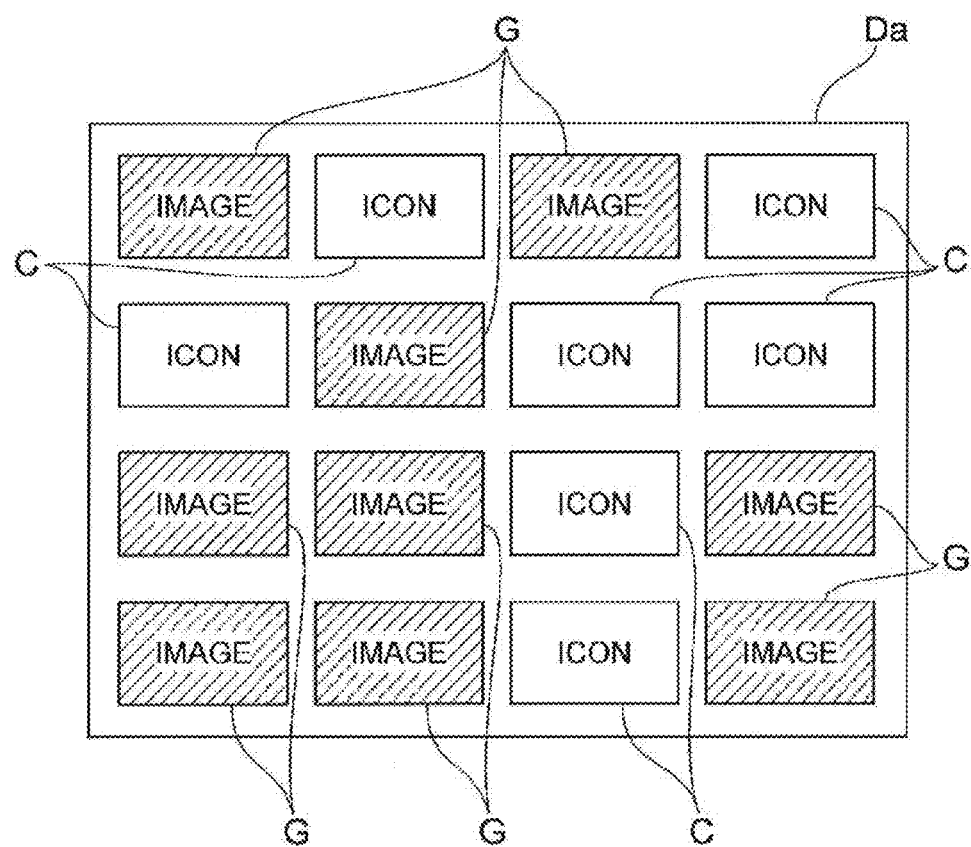
FIG. 6 is a diagram showing an example of a display area in which a web page is displayed.
Figure 7:
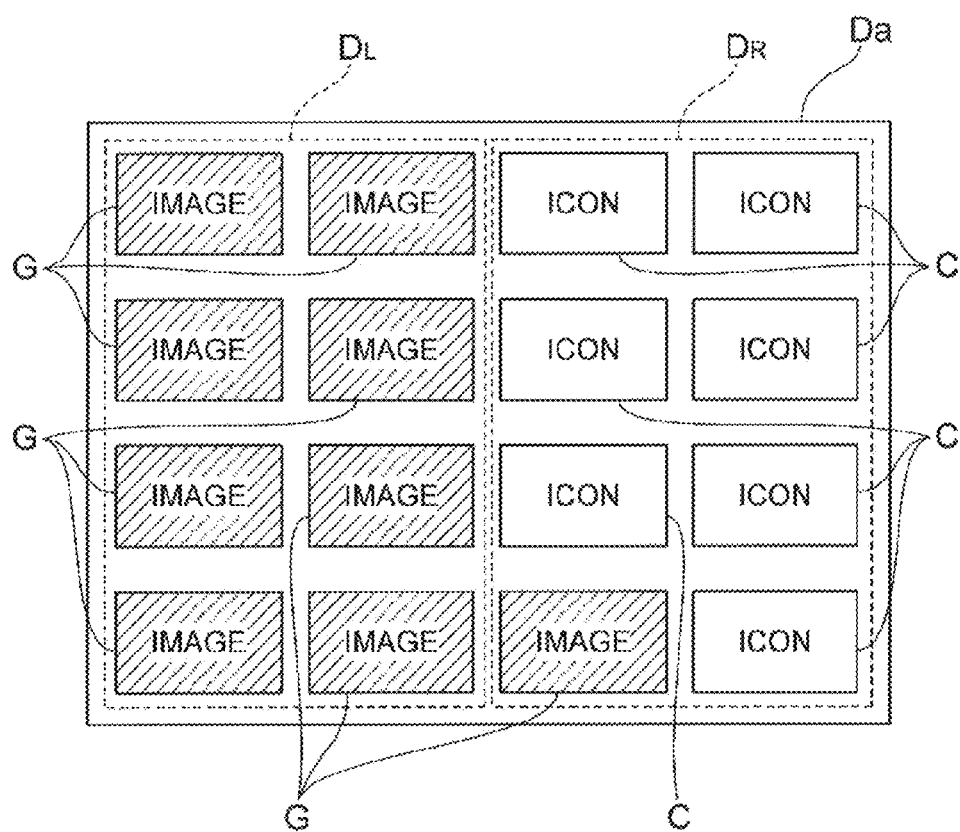
FIG. 7 a diagram showing an example of a web page in which layout of objects is adjusted.

The adjusting unit 13 adjusts the layout of objects contained in the second web page based on the information related to the selected position of the object in the operation information. The layout processing is specifically described with reference to FIGS. 6 and 7. FIG. 6 is a diagram showing an example of the case where the second web page before adjustment is displayed in the display area Da. FIG. 7 is a diagram showing an example of the case where the second web page after adjustment is displayed in the display area Da. The second web page contains a plurality of objects to be displayed. The objects include icons C to be operated by a user and images G not to be operated by a user.

For example, when the information about the deviation of the selected position in the region where the selection of an object is detectable is contained in the operation information, the adjusting unit 13 can place selectable objects which are contained in the second web page in a specified region that is set in accordance with the direction of the deviation in the display area Da. To be more specific, when the adjusting unit 13 acquires the operation information about the selection in the region which is deviated to the left or right in the region where the selection of an object is detectable from the storing unit 12, it places selectable objects which are contained in the second web page in the region which is deviated to the left or right in the display area Da. For example, when the adjusting unit 13 acquires the operation information indicating selection in the right-hand region $M_R$ in the selection of an object shown in FIG. 5, it places the selectable icons C which are contained in the second web page in a right-hand display region $D_R$ in the display area Da as shown in FIG. 7. On the other hand, when the adjusting unit 13 acquires the operation information indicating selection in the left-hand region $M_L$, it places the selectable icons C which are contained in the second web page in a left-hand display region $D_L$ in the display area Da. Note that the adjusting unit 13 may place selectable objects which are contained in the second web page in a specified region that is deviated to the left-hand display region $D_L$ or the right-hand display region $D_R$ in the display area Da when the number of acquired operation information indicating the deviation to the left or right of the selected position becomes a specified number or more.

Note that, when the information about the deviation of the selected position is not contained in the operation information and the coordinates of the selected position is contained therein, the adjusting unit 13 may acquire the coordinate information of the display position of the object and determine the deviation of the selected position based on a positional relationship with the coordinates of the selected position.

In the case where there is a deviation in a given direction at the selected position of the object, it is highly likely that a user holds or operates the terminal in the state where a region deviated in the direction of the deviation in the display area is easy to operate. Thus, by placing objects such as icons in the second web page in the specified region that is set according to the direction of the deviation in the display area in accordance with the deviation of the selected position of the object in the first web page, it is possible to provide the web page suitable for the tendency of the user's operation.

Further, the adjusting unit 13 adjusts the display size of the second web page based on the information related to the changing of the display size of the first web page. For example, in the case where the operation information about the operation to scale up the display size of contents such as objects contained in the first web page is acquired from the terminal 20, it is highly likely that a user of the terminal 20 has a preference for display with a larger display size. Thus, in this case, it is preferred to provide the second web page with an enlarged display size to the terminal 20.

Specifically, when the adjusting unit 13 acquires the operation information about the operation to scale up the display size from the storing unit 12, it makes adjustment so that the display contents in the second web page are scaled up to a specified display size. On the other hand, when the adjusting unit 13 acquires the operation information about the operation to scale down the display size from the storing unit 12, it makes adjustment so that the display contents in the second web page are scaled down to a specified display size.

Note that the adjusting unit 13 may adjust the display size of some of the selectable objects in the second web page, for example, rather than adjusting the display size of all of the display contents in the second web page. Specifically, the adjusting unit 13 may make adjustment to scale up only a part for which a link to another web page is set in the second web page. It is thereby possible to provide a web page that allows easy selection. Further, when the adjusting unit 13 acquires the operation information about the operation to scale up image objects in the first web page, it may make adjustment to scale up image objects in the second web page. Further, in such a case, the adjusting unit 13 may make adjustment to scale down the display size of selectable objects in the second web page.

Further, the web server 10 may include the web page storing unit 14. The web page storing unit 14 is a storing means that stores different display modes related to the second web page in association with the conditions related to the operation information. FIG. 8 is a diagram showing the configuration of the web page storing unit 14 and an example of data stored therein. In FIG. 8, the display modes related to the second web page, such as pattern 1, pattern 2 and pattern 3, are stored in association with the conditions related to the operation information such as "right-hand operation tendency", "left-hand operation tendency" and "frequent scaling operation". The condition related to the operation information "right-hand operation tendency" is the condition that applies when more than a specified number of operation information about the selection in a region deviated to the right of an object in the first web page are acquired. Further, the condition related to the operation information "left-hand operation tendency" is the condition that applies when more than a specified number of operation information about the selection in a region deviated to the left of an object in the first web page are acquired. Furthermore, the condition related to the operation information "frequent scaling operation" is the condition that applies when more than a specified number of operation information about the scaling of the display size in the first web page are acquired.

The display mode related to the second web page "pattern 1" is the display mode where selectable objects such as icons C are placed in a specified region that is deviated to the right in the display area Da as shown in FIG. 7, for example. Further, the display mode related to the second web page "pattern 2" is the display mode where selectable objects such as icons C are placed in a specified region that is deviated to the left in the display area Da. Furthermore, the display mode related to the second web page "pattern 3" is the display mode where adjustment is made to scale up the display contents to a specified display size.

In the case where the web server 10 includes the web page storing unit 14 described above, the adjusting unit 13 determines whether one or more operation information acquired from the storing unit 12 matches the condition related to the operation information in the web page storing unit 14 and, when the matching condition exists, it can extract the display mode related to the second web page which is associated with the condition and set the second web page in the extracted display mode as the adjusted second web page.

Further, when the information related to the scrolling of the first web page is contained in the operation information, the adjusting unit 13 can adjust an attribute value related to the amount of movement of the display contents with respect to the scrolling in the second web page. To be more specific, when more than a specified number of operation information about the scrolling are acquired or when the operation information indicating more than a specified speed of a contact position between a region where physical contact with the touch panel D is detectable and a user's finger is acquired or the like, for example, the adjusting unit 13 can adjust the attribute value to increase the amount of movement of the display area at the time of scrolling the second web page. Further, when the operation information related to the scrolling by less than a specified amount of movement of a contact position between the tough panel and a user's finger is acquired, for example, the adjusting unit 13 can adjust the attribute value to decrease the amount of movement of the display area at the time of scrolling the second web page.

The adjusting unit 13 transmits the second web page that is adjusted as described above to the transmitting unit 15. The transmitting unit 15 is a part that transmits the second web page adjusted by the adjusting unit 13 to the terminal 20 in response to a request from the terminal 20.

Figure 9:
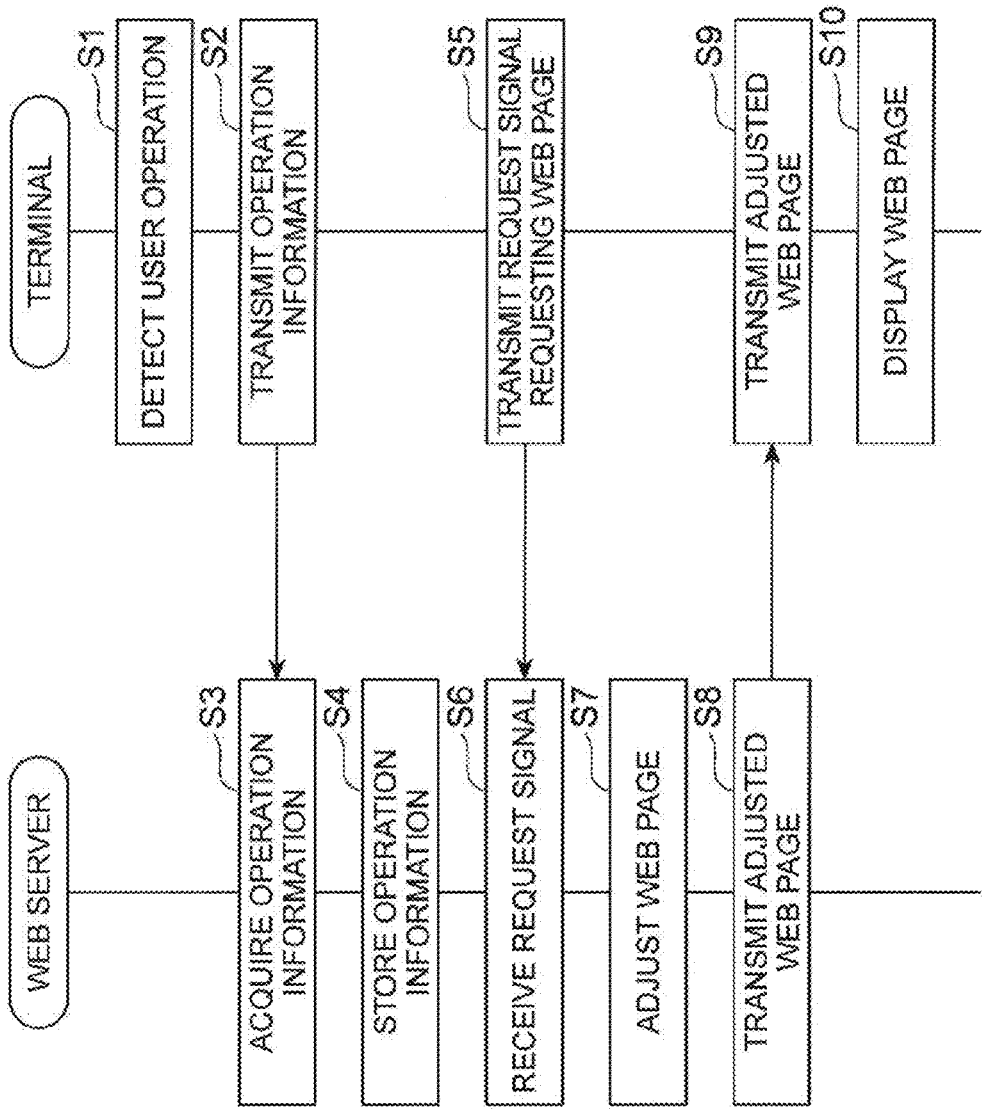
FIG. 9 is a sequence chart showing an operation of the web system shown in FIG. 1.

The operation of the web system 1 according to this embodiment is described hereinafter with reference to FIG. 9. FIG. 9 is a flowchart showing processing performed in the web system 1.

First, the detecting unit 23 of the terminal 20 detects a user's operation on the first web page that is displayed in the display area Da based on physical contact with the display area Da (S1). Next, the operation information transmitting unit 24 transmits operation information indicating the user's operation that is detected by the detecting unit 23 to the web server 10 (S2).

Then, the acquiring unit 11 of the web server 10 acquires the operation information that is transmitted from the terminal 20 (S3, acquiring step) and stores the acquired operation information into the storing unit 12 (S4, storing step). Note that, in the case where the detecting unit 23 of the terminal 20 detects a user's operation repeatedly (S1), the processing of Steps S1 to S4 is repeated.

When a request signal requesting the second web page is transmitted from the terminal 20 to the web server 10 (S5), the web server 10 receives the request signal (S6). Receiving the request signal, the adjusting unit 13 of the web server 10 adjusts the second web page based on the operation information that is stored in the storing unit 12 (S7, adjusting step). Then, the transmitting unit 15 transmits the second web page that is adjusted by the adjusting unit 13 in response to the request signal to the terminal 20 (S8, transmitting step).

The receiving unit 21 of the terminal 20 receives the second web page that is transmitted from the web server 10 (S9), and the display control unit 22 displays the second web page that is received by the receiving unit 21 in the display area Da of the touch panel D (S10). By the above process, the web page that is adjusted based on the operation information can be displayed on the terminal 20.

Figure 10:
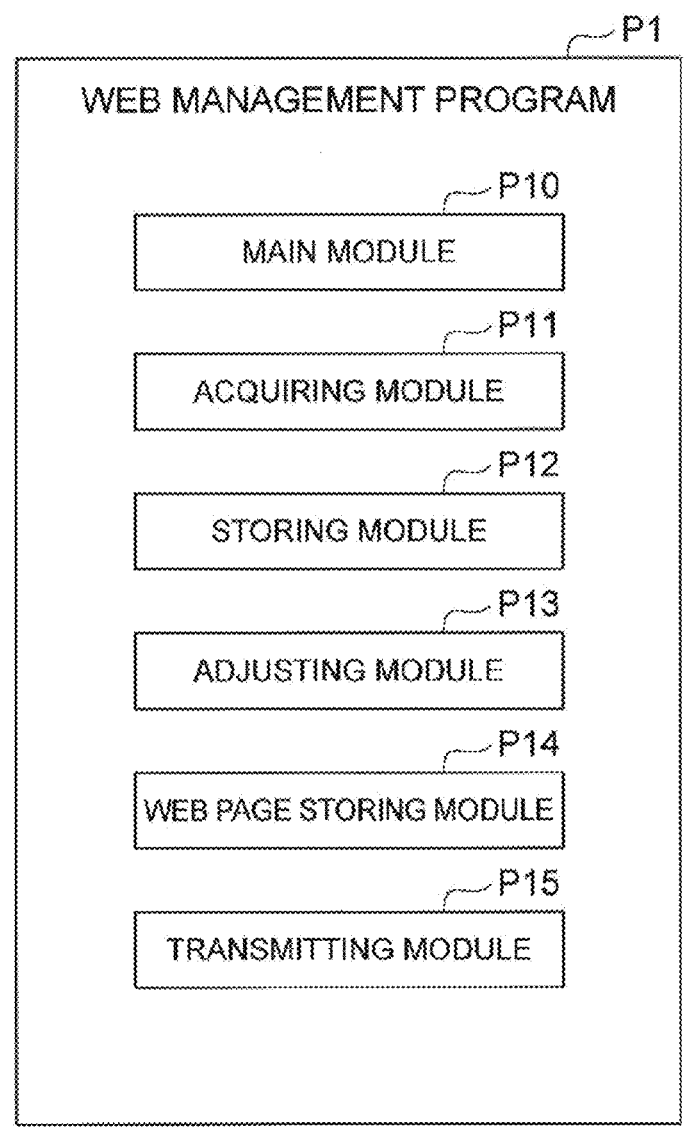
FIG. 10 is a diagram showing a structure of a web management program.

A web management program for causing a computer to function as the web server 10 is described hereinafter with reference to FIG. 10.

A web management program P1 includes a main module P10, an acquiring module P11, a storing module P12, an adjusting module P13, and a transmitting module P15. The web management program P1 may further include a web page storing module P14.

The main module P10 is a part that exercises control over the web page adjustment process. The functions implemented by executing the main module P10, the acquiring module P11, the storing module P12, the adjusting module P13, the transmitting module P15 and the web page storing module P14 are equal to the functions of the acquiring unit 11, the storing unit 12, the adjusting unit 13, the transmitting unit 15 and the web page storing unit 14 shown in FIG. 2, respectively.

The web management program P1 is provided through a storage medium such as CD-ROM or DVD-ROM or semiconductor memory, for example. Further, the web management program P1 may be provided as a computer data signal superimposed onto a carrier wave over a communication network.

In the web server 10, the web system 1 and the web management program P1 according to this embodiment described above, the operation information indicating a user's operation on the terminal 20 is acquired, and the second web page to be displayed in the display area of the terminal 20 is adjusted based on the acquired operation information. Then, the adjusted second web page is transmitted to the terminal 20. Because the web page is adjusted in this manner, the tendency of the user's operation is reflected on the web page. It is thus possible to provide the web page suitable for the tendency of the user's operation.

Further, in consideration that, at the time when a user selects an object displayed in the display area of the terminal 20, a certain tendency appears in the selected position of the object due to the way the user holds or operates the terminal 20, in the web server 10 according to this embodiment, the second web page to be displayed on the display area Da is adjusted based on information about the selected position of the object, and therefore the tendency on the basis of the way the user holds or operates the terminal 20 is reflected on the web page. It is thus possible to provide the web page suitable for the tendency of the user's operation.

Further, in the web server 10 according to this embodiment, because information about the deviation of the selected position in the region where the selection of an object is detectable is acquired, the tendency of the selected position can be appropriately acquired. Furthermore, because objects contained in the second web page to be displayed in the display area Da are placed in a specified region in accordance with the direction of the deviation based on that information, it is possible to make adjustment of the web page suitable for the tendency of the user's operation.

Further, in the web server 10 according to this embodiment, because the display size of the second web page to be displayed in the display area of the terminal 20 is adjusted based on information about the changing of the display size of the first web page by a user, it is possible to reflect the display size of the web page desired by a user in advance at the time of displaying the web page in the display area of the terminal.

Further, in the web server 10 according to this embodiment, because an attribute value related to the amount of movement of the display contents with respect to the scrolling of the second web page to be displayed in the display area Da of the terminal 20 is adjusted based on information about the scrolling of the first web page by a user, it is possible to reflect the tendency of the scrolling desired by a user in advance at the time of displaying the web page in the display area of the terminal.

Second Embodiment

Figure 11:
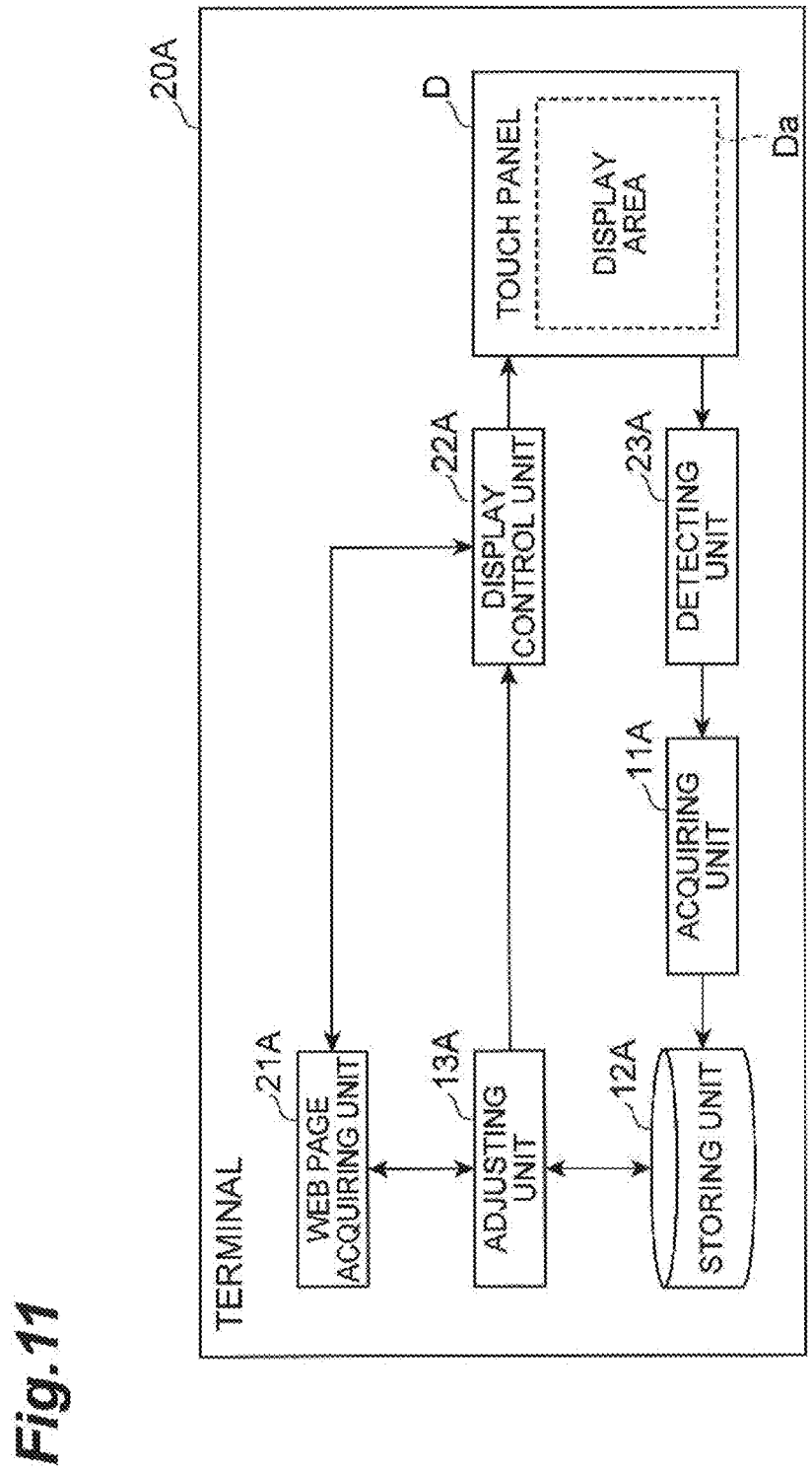
FIG. 11 is a block diagram showing a functional configuration of a terminal according to a second embodiment.

A terminal 20A according to a second embodiment is described with reference to FIG. 11. The terminal 20A according to the second embodiment can be implemented as the web management device according to the present invention.

The terminal 20A has a touch panel D and includes a web page acquiring unit 21A, a display control unit 22A, a detecting unit 23A, an acquiring unit 11A (acquiring means), a storing unit 12A (storing means), and an adjusting unit 13A (adjusting means) as functional components.

The web page acquiring unit 21A is a part that acquires a first web page to be displayed in the display area Da. The web page acquiring unit 21A may acquire the first web page from a web server with which communication can be performed through a network or may acquire the prestored one. Further, the web page acquiring unit 21A can acquire a second web page whose display mode or the like is to be adjusted by the adjusting unit 13A in the same manner.

The display control unit 22A is a means of controlling display so that the first web page that is input from the web page acquiring unit 21A is displayed on the touch panel D. The first web page is thereby displayed in the display area Da of the touch panel D. Further, the display control unit 22A controls display so that the second web page that is input from the adjusting unit 13A is displayed on the touch panel D.

The detecting unit 23A has the same function as the detecting unit 23 in FIG. 4. Specifically, the detecting unit 23A detects a user's operation on the first web page that is displayed in the display area Da.

The acquiring unit 11A acquires operation information indicating the user's operation on the first web page that is detected by the detecting unit 23A. The acquiring unit 11A then stores the acquired operation information into the storing unit 12A. The storing unit 12A is a storing means that stores the operation information.

The adjusting unit 13A has the same function as the adjusting unit 13 in FIG. 2. Specifically, the adjusting unit 13A adjusts the second web page to be displayed in the display area Da based on the operation information that is stored in the storing unit 12A. The adjusting unit 13A then transmits the adjusted second web page to the display control unit 22A.

As described above, in the terminal 20A according to the second embodiment, the operation information indicating a user's operation on the first web page that is displayed in the display area Da is acquired, and the second web page to be displayed in the display area Da is adjusted based on the acquired operation information. Then, the adjusted second web page is displayed in the display area Da. Because the web page is adjusted in this manner, the tendency of the user's operation is reflected on the web page. It is thus possible to provide the web page suitable for the tendency of the user's operation.

Third Embodiment

A third embodiment is an embodiment for describing in detail the processing of acquiring position information to be used for acquisition of the operation information in the first embodiment and the second embodiment.

The function and configuration of the web system 1 according to the third embodiment are described hereinafter with reference to FIGS. 12 to 20. The web system 1 is a computer system that provides a web page to a user and compiles the modes of user's operations on the web page. The web system 1 includes a web server 10B that provides a web page and a terminal 20B that is owned by a user. The web server 10B and the terminal 20B can communicate with each other through a communication network N that is the Internet, a wireless LAN, a mobile communication network or the like. In the web system shown in FIG. 1, one web server 10 and three terminals 20B are connected with one another through the network N, and the web system according to the third embodiment also has a configuration in which the web server 10B and the terminals 20B are connected through the network N. Note that the number of terminals 20B in the system is arbitrary.

Figure 12:
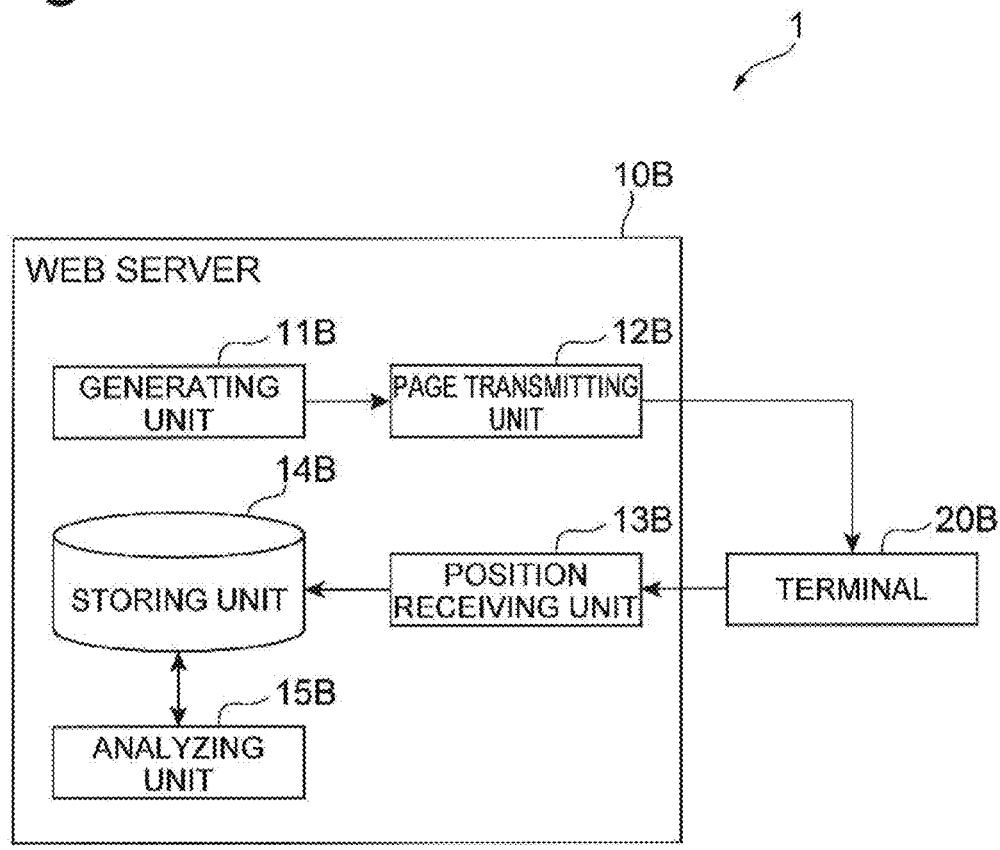
FIG. 12 is a block diagram showing a functional configuration of a web server according to a third embodiment.

The web server 10B is described first. As shown in FIG. 12, the web server 10B includes a generating unit 11B (generating means), a page transmitting unit 12B (transmitting means), a position receiving unit 13B (acquiring means), a storing unit 14B (storing means), and an analyzing unit 15B (adjusting means) as functional components. Note that only the functional units related to the acquisition and compilation of position information are shown in FIG. 12.

The web server 10B has the hardware configuration as shown in FIG. 3, just like the web server 10 according to the first embodiment.

Referring back to FIG. 12, the generating unit 11B is a means of generating a web page to be transmitted to the terminal 20B. The generating unit 11B generates a web page in accordance with a request signal transmitted from the terminal 20B in response to a user's operation and outputs the generated web page to the page transmitting unit 12B.

The structure of the web page that is generated by the generating unit 11B is described hereinafter. In this embodiment, the web page at least contains one or more image objects (banners) in which a link to another web page is embedded. Each image object is identified by an identifier called an image ID. In each image object, a detectable range for acquiring the position of tapping (clocking) on the image object when displayed on the terminal 20B is set. The position is indicated by two-dimensional coordinates (xy coordinates; referred to hereinafter simply as "coordinates"). Note that the detectable range may be set not for all of the image objects but for some of the image objects. Examples of the image objects and a method of setting the detectable range include the following three patterns.

Figure 13:
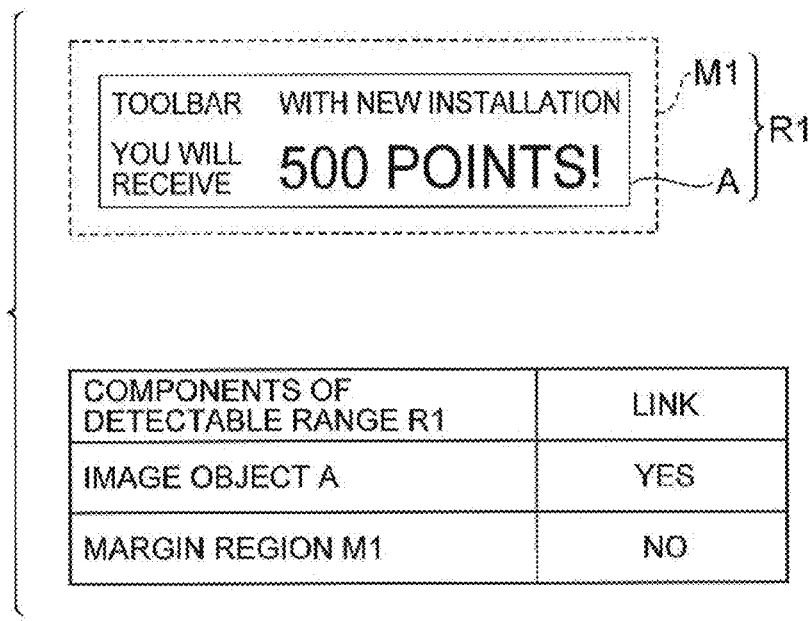
FIG. 13 is a diagram showing an example of setting of a detectable range.

[Pattern 1]
A detectable range R1 shown in FIG. 13 is composed of an image object A and a margin region M1 on the periphery (in the vicinity) of the object A. A link is embedded in the image object A but not embedded in the margin region M1. Thus, when tapping is made within the range of the image object A, switching to a linked web page is performed, and detection of the coordinates of the tapping is also performed. On the other hand, when tapping is made within the margin region M1, page switching is not performed, and only detection of the coordinates of the tapping is performed.

Figure 14:
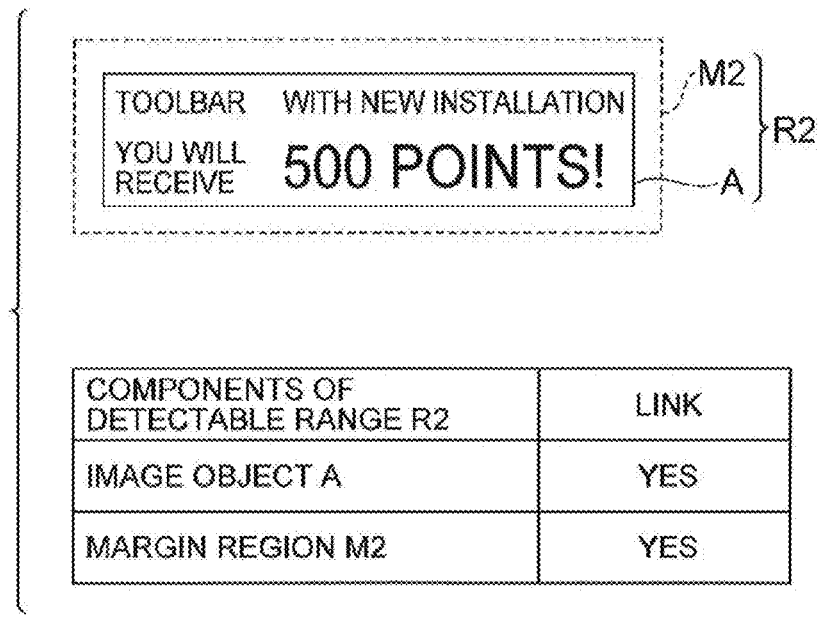
FIG. 14 is a diagram showing an example of setting of a detectable range.

[Pattern 2]
A detectable range R2 shown in FIG. 14 is composed of an image object A and a margin region M2 on the periphery of the object A. A link is embedded in both of the image object A and the margin region M1. Thus, when tapping is made within the range of the detectable range R2, switching to a linked web page is always performed, and detection of the coordinates of the tapping is also performed. In this manner, when a link is embedded also in the margin region M2, switching of a web page is made even when tapping is done not on the object but on the periphery of the object, which enhances the convenience of the web page.

It should be noted that the same mode is implemented when preparing an image object having a margin on its outer edge and setting only the range of the image object as a detectable range. In this case, a code can be written using the onClick event of JavaScript (trademark or registered trademark).

Figure 15:
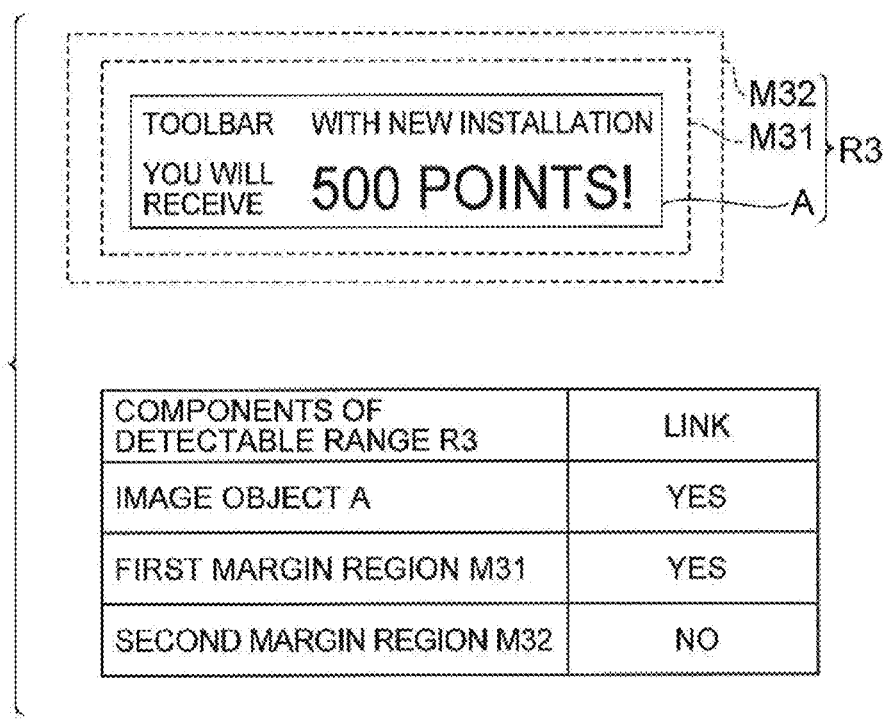
FIG. 15 is a diagram showing an example of setting of a detectable range.

[Pattern 3]
A detectable range R3 shown in FIG. 15 is composed of an image object A, a first margin region M31 adjacent to the object A, and a second margin region M32 located on the outside of the first margin region M31. A link is embedded in the image object A and the first margin region M31 but not embedded in the second margin region M32. Thus, when tapping is made within the range of the image object A or the first margin region M31, switching to a linked web page is performed, and detection of the coordinates of the tapping is also performed. On the other hand, when tapping is made within the second margin region M32, page switching is not performed, and only detection of the coordinates of the tapping is performed.

In this manner, the margin region is provided in the vicinity of the image object because a user tends to tap the outside of the image object. Setting not only the image object but also its proximity as the detectable range allows more taps to be recognized, which captures the tendency in more detail.

Note that the width of each margin region is arbitrary in any of the above patterns 1 to 3. For example, the width can be 25 pixels (in this case, margin regions with a width of 50 pixels in total are generated in the above pattern 3). Further, the width of margin regions may be different at the top, bottom, left and right of the image object A. Further, a margin region may be put on the outside of the image object and further a margin may be provided on the outer edge of the image object.

In this embodiment, the web page in which the image object and the detectable range are embedded is generated using JavaScript (trademark or registered trademark). In the code of the web page, the detectable range is defined using information about the image object (image ID, coordinates of starting point, coordinates of endpoint, width, height etc) and the width of the margin region. Further, the coordinates of tapping that occurs within the web page is acquired through the event object. Then, the coordinates of tapping and the detectable range are compared to thereby determine whether the tapping is made within the detectable range or not.

The code of the web page further includes a function for transmitting position information in which the coordinates indicating the position of tapping made in the detectable range and the image ID of the image object contained in the detectable range are associated to the web server 10B. In the case of switching pages when tapping is made in the margin region outside the image object as in the above patterns 2 and 3, the window.location.href method is also included in the code of the web page. It is possible to execute the transmission of the position information to the web server 10B and the switching of pages.

Referring back to FIG. 12, the page transmitting unit 12B is a means of transmitting the web page that is input from the generating unit 11B to the terminal 20B from which a request has been made.

The position receiving unit 13B is a means of receiving the position information indicating the position of tapping that has been made within the detectable range of the web page from the terminal 20B that displays the web page transmitted by the page transmitting unit 12B. The structure of the position information is as described above. The position receiving unit 13B stores the received position information into the storing unit 14B. Note that the position receiving unit 13B can store the position information into the storing unit 14B for each user of the terminal 20B.

The storing unit 14B is a means of storing the position information that is input from the position receiving unit 13B. Each time a user taps the detectable range of the web page through the terminal 20B, the position receiving unit 13B receives the position information corresponding to the operation and stores it into the storing unit 14B. Consequently, the position information is accumulated in the storing unit 14B. Note that the storing unit 14B can store the position information in association with the identifier of a user of the terminal 20B.

The analyzing unit 15B is a means of compiling the position information stored in the storing unit 14B and outputting a compilation result. The compilation and output process may be performed in response to an operation of an administrator of the web server 10B or performed on a regular basis by batch processing or the like. The position information compiled and output by the analyzing unit 15B can be used for acquisition of the operation information. Note that, when the position information is stored in the storing unit 14B in association with the identifier of a user, the analyzing unit 15B can compile the position information for each user and output the compilation result for each user.

Figure 16:
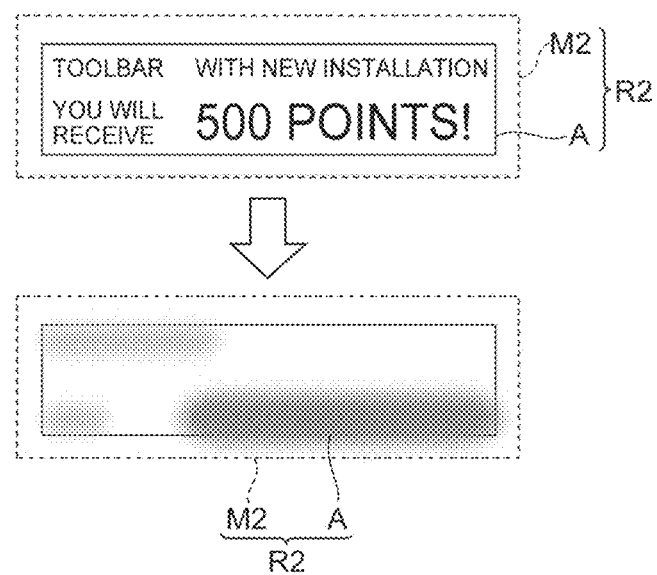
FIG. 16 is a diagram showing an example of compilation of position information.

The function of the analyzing unit 15B is described using the example of FIG. 16. FIG. 16 is a diagram showing a compilation result for the detectable range R2 shown in FIG. 14. The analyzing unit 15B reads all of the position information containing the image ID of the image object A from the storing unit 14B. The analyzing unit 15B then displays graphics indicating the image object A and the detectable range R2 on the monitor and provides gradations in the graphics based on the coordinates of each position information. At this time, the analyzing unit 15B provides gradations so that the color is darker in the part which is tapped more frequently.

With such display, an administrator of the web server 10B can grasp the tendency of tapping on the image object A at a glance. The example of FIG. 16 shows that a user has a high tendency to tap the lower right of the image object A (the character string "500 points!" and its vicinity), and therefore it is estimated that there are many right-handed users. Further, because tapping is made also on the left side of the image object A (the character strings "Toolbar" and "You will receive" and their vicinity), it is estimated that there are a certain number of left-handed users as well. In addition, seeing the lower left and the left side of the image object A, there is also a tendency that the outside of the image object A is tapped. It is thus estimated that there are a certain number of users who feel uncomfortable when the characters get hidden by the finger at the time of tapping, and it can be predicted that Click Through Rate (CTR) will increase when a wider margin is provided for the image object A.

It should be noted that a method of representing a compilation result is not limited to the example of FIG. 16. For example, an image object may be divided into a plurality of blocks, and the frequency of tapping may be displayed for each block. Further, a method of outputting a compilation result is not limited to screen display. For example, the analyzing unit 15B may output a compilation result by an arbitrary way such as printing, storing into a database or transmission to another computer system.

Figure 17:
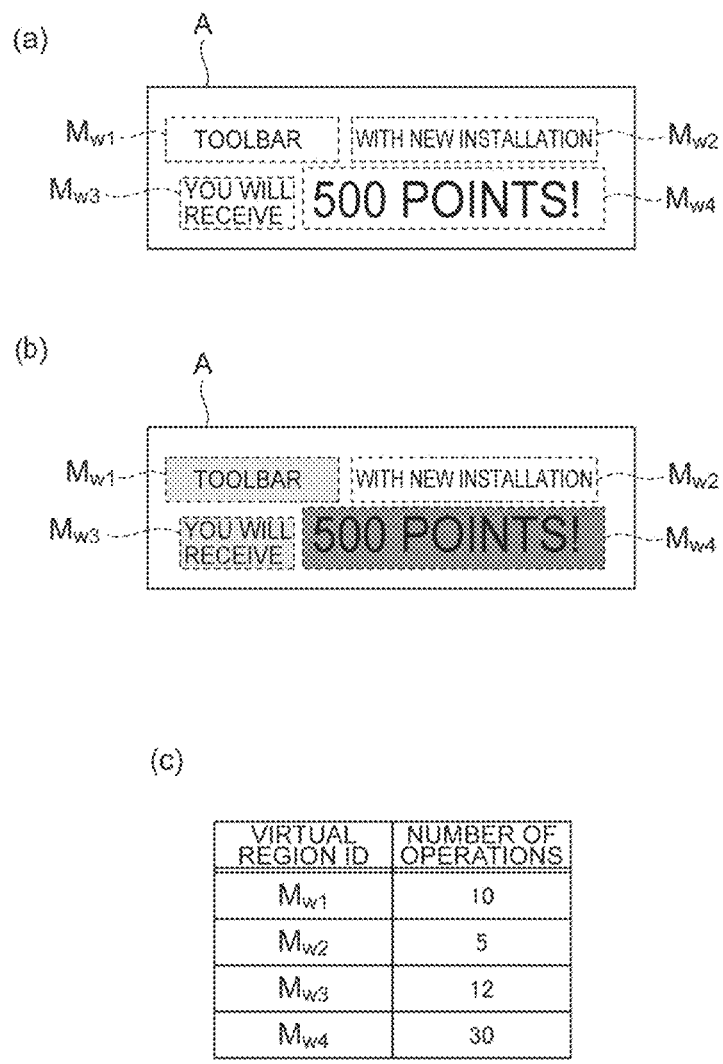
FIG. 17 is a diagram showing examples of setting of a virtual area in an object and compilation of position information.

Another example of a method of compiling selected positions (position information) in the analyzing unit 15B is described with reference to FIG. 17. Specifically, in the case where a character is contained in the image object, a virtual region may be set in the image object for each of regions in which a character, a phase composed of a plurality of characters, or a sentence is displayed, and a position (selected position) where tapping is made may be represented by an identifier indicating the virtual region.

In this case, the analyzing unit 15B sets virtual regions $M_{W1}$ to $M_{W4}$ for each of phrases contained in the image object A as shown in FIG. 17(a). Specifically, the virtual regions $M_{W1}$ to $M_{W4}$ include phrases "Toolbar", "With new installation", "You will receive" and "500 points!", respectively. First, the analyzing unit 15B reads all of the position information containing the image ID of the image object A from the storing unit 14B and determines the virtual regions $M_{W1}$ to $M_{W4}$ to which the read position information belongs. The selected position by a user is thereby represented by the identifier of the virtual region. The analyzing unit 15B then displays graphics indicating the image object A and the virtual regions $M_{W1}$ to $M_{W4}$ on the monitor, provides colors with a darkness in accordance with the number of position information belonging to each of the virtual regions $M_{W1}$ to $M_{W4}$ in the virtual regions $M_{W1}$ to $M_{W4}$ and displays them. FIG. 17(b) is a display example of the selected position (position information) compiled in this manner.

With such display, an administrator of the web server 10B can grasp the tendency of tapping on the image object A at a glance. According to the example of FIG. 17(b), it is easily found that a region which is tapped most frequently by a user is the virtual region $M_{W4}$. Further, a method of outputting a compilation result is not limited to screen display as shown in FIG. 17(b). For example, as shown in FIG. 17(c), the analyzing unit 15B may output the number of tappings in each virtual region to a table and present the table to the administrator. The web server 10B can acquire the operation information in the first embodiment based on the operation information compiled in this manner.

Figure 18:
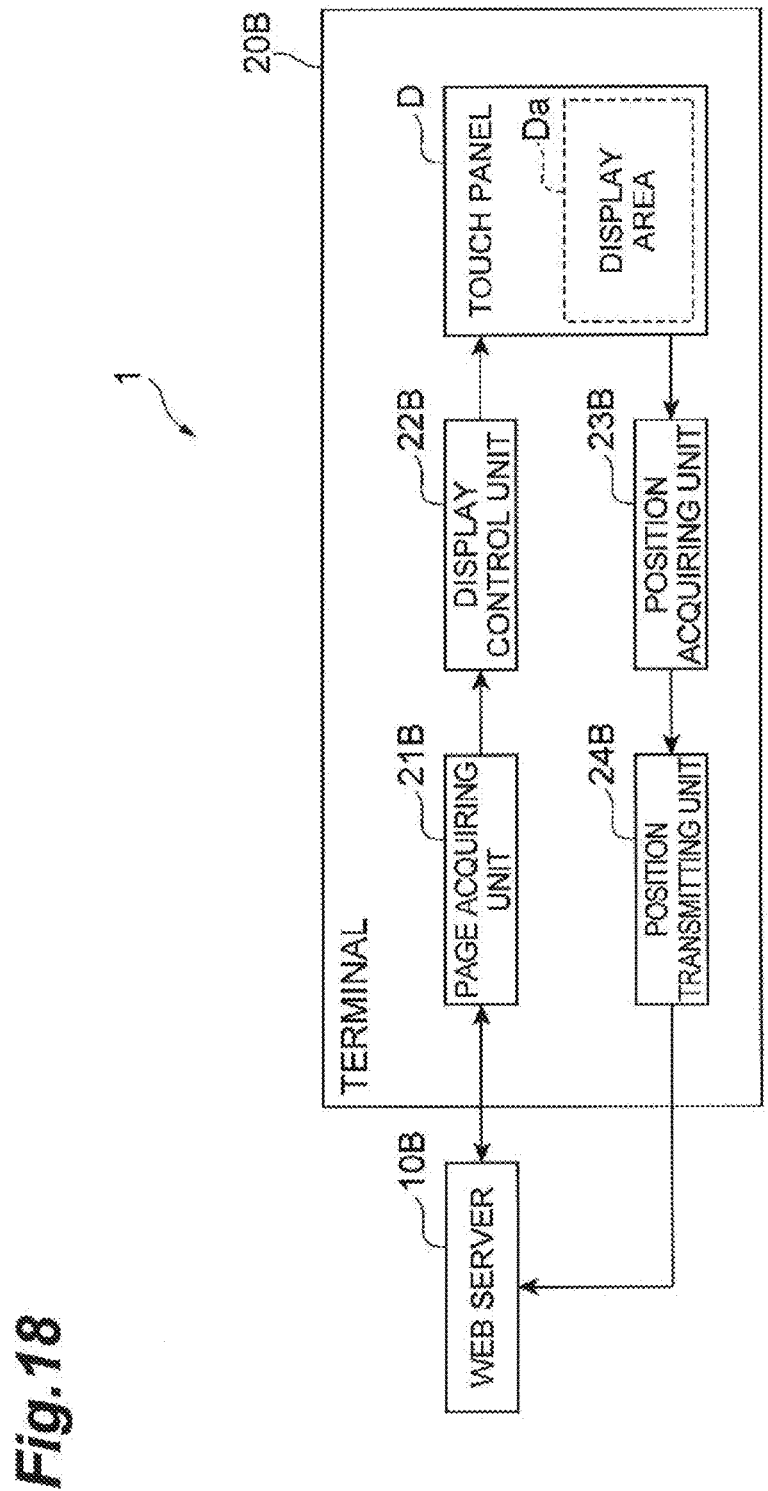
FIG. 18 is a block diagram showing a functional configuration of a terminal according to the third embodiment.

The terminal 20B is described hereinbelow. As shown in FIG. 18, the terminal 20B has a touch panel D and includes a page acquiring unit 21B, a display control unit 22B, a position acquiring unit 23B, and a position transmitting unit 24B as functional components. One example of the terminal 20B is a tablet machine; however, the type of the terminal is not particularly limited as long as it is a communication device having the touch panel D. The terminal may be mobile or stationary.

The touch panel D is an input device that has a display area Da and displays various kinds of information on the display area Da and further detects physical contact with the display area Da. An example of the physical contact includes tapping by a pointing device such as a touch pen, a finger or the like.

The page acquiring unit 21B is a means of requesting a web page to be displayed on the touch panel D to the web server 10B and receiving a web page transmitted from the web server 10B in response to the request. When processing for acquiring a web page is performed in the terminal 20B in response to a user's operation, the page acquiring unit 21B generates and transmits a request signal for requesting the web page. The page acquiring unit 21B then receives a web page generated and transmitted by the web server 10B in response to the request signal. In the received web page, a detectable range for each image object is set as described above. The page acquiring unit 21B outputs the received web page to the display control unit 22B.

The display control unit 22B is a means of controlling display so that the web page that is input from the page acquiring unit 21B is displayed on the touch panel D. The web page is thereby displayed in the display area Da of the touch panel D.

The position acquiring unit 23B is a means of acquiring the position of physical contact with the web page that is displayed in the display area Da. When tapping is made on the display area Da, the position acquiring unit 23B detects the event through the touch pane D and acquires the coordinates indicating the position of the tapping. The position acquiring unit 23B then compares the acquired coordinates with the detectable range of the displayed web page.

If the tapping is made in a specific detectable range, the position acquiring unit 23B determines that the image object existing in the detectable range is selected and sets the acquired coordinates as the coordinates of the selected position. The position acquiring unit 23B then generates position information by associating the image ID of the selected image object with the coordinates of the selected position and outputs the position information to the position transmitting unit 24B. On the other hand, if the position of the tapping is outside any detectable range, the position acquiring unit 23B ends the process without generating position information.

The position acquiring unit 23B executes the above processing each time tapping is performed on the web page. At least some of functions of the position acquiring unit 23B are implemented as a result that JavaScript (trademark or registered trademark) embedded in the web page is read by the CPU 101 and executed.

Note that, when tapping is performed in the detectable range, and a link is embedded in the position of the tapping, the page acquiring unit 21B transmits a request signal requesting a web page corresponding to the link to the web server 10B.

The position transmitting unit 24B is a means of transmitting the position information that is input from the position acquiring unit 23B to the web server 10B. The transmitted position information is stored into the storing unit 14B of the web server 10B as described above.

Figure 19:
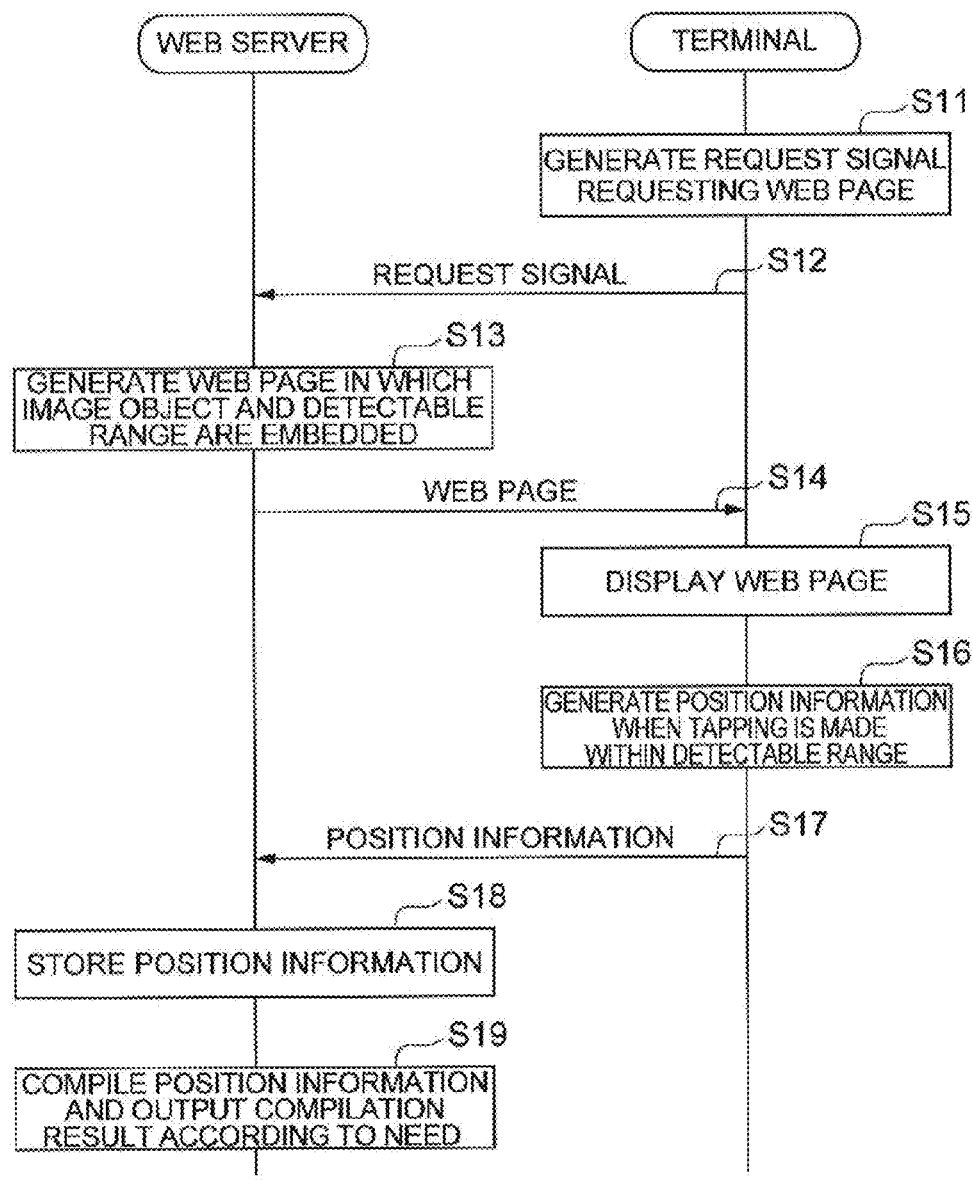
FIG. 19 is a sequence chart showing an operation of a web system according to the third embodiment.

Hereinafter, the operation of the web system 1 shown in FIG. 1 is described and a web management method according to this embodiment is further described with reference to FIG. 19.

When a user who desires to view a certain web page performs a specified operation on the terminal 20B, the page acquiring unit 21B generates a request signal requesting the web page (Step S11) and transmits the signal to the web server 10B (Step S12).

In the web server 10B, the generating unit 11B generates a web page in which the image object, the detectable range and the like are embedded based on the request signal (Step S13, generating step). Then, the page transmitting unit 12B transmits the web page to the terminal 20B as a response to the request signal (Step S14, transmitting step).

In the terminal 20B, the page acquiring unit 21B receives the web page, and the display control unit 22B displays the page in the display area Da of the touch panel D (Step S15). After that, when tapping is performed within the detectable range of the web page, the position acquiring unit 23B generates position information indicating the selected position of the image object corresponding to the range (Step S16). Then, the position transmitting unit 24B transmits the position information to the web server 10B (Step S17).

In the web server 10B, the position receiving unit 13B receives the position information (receiving step) and stores it into the storing unit 14B (Step S18, storing step).

If tapping is made repeatedly within any detectable range for one displayed web page, the processing of Steps S16 to S18 is executed a plurality of times accordingly. Further, when a specified link is selected by tapping on the displayed web page, the processing of Steps S11 to S18 is performed again. Consequently, the position information is accumulated in the storing unit 14B.

After the position information is accumulated in this manner, the analyzing unit 15B compiles the position information based on an administrator's operation or an instruction of batch processing and outputs a compilation result (Step S19, output step).

Figure 20:
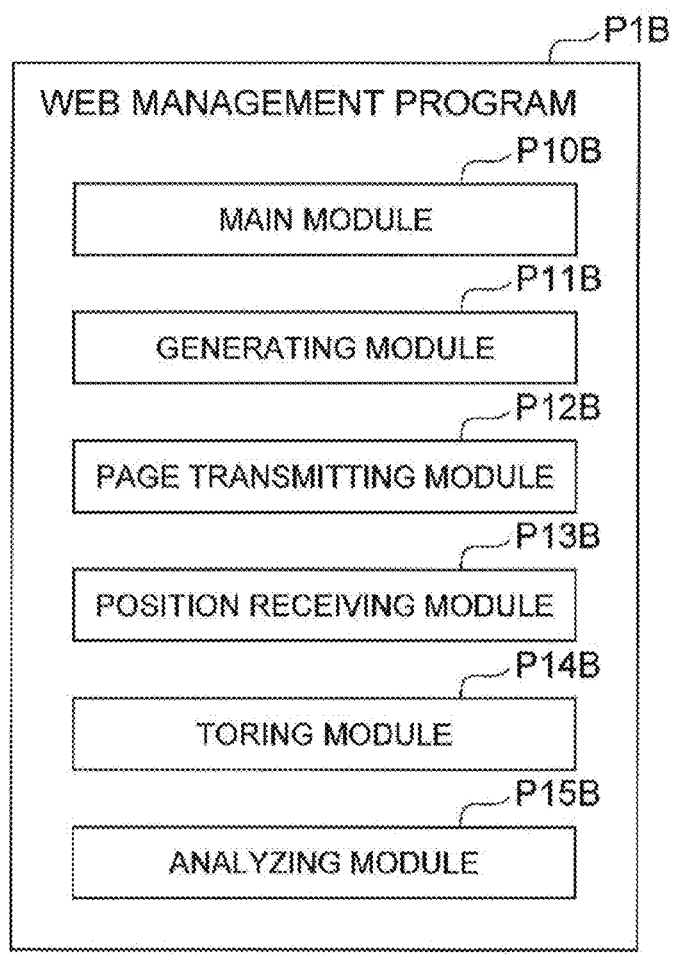
FIG. 20 is a diagram showing a structure of a web management program according to the third embodiment.

A web management program for causing a computer to function as the web server 10B is described hereinafter with reference to FIG. 20.

A web management program P1B includes a main module P10B, a generating module P11B, a page transmitting module P12B, a position receiving module P13B, a storing module P14B, and an analyzing module 15B.

The main module P10B is a part that exercises control over the web management. The functions implemented by executing the generating module P11B, the page transmitting module P12B, the position receiving module P13B, the storing module P14B, and the analyzing module 15B are equal to the functions of the generating unit 11B, the page transmitting unit 12B, the position receiving unit 13B, the storing unit 14B and the analyzing unit 15B, respectively.

The web management program P1B is provided in the form of being stored in a recording medium such as CD-ROM or DVD-ROM or semiconductor memory, for example. Further, the web management program P1 may be provided as a computer data signal superimposed onto a carrier wave over a communication network.

As described above, according to this embodiment, the detectable range for detecting the position of physical contact with an image object is embedded in a web page, transmitted to the terminal 20B and displayed. After that, when physical contact occurs within the detectable range, the contact position is transmitted as position information from the terminal 20B to the web server 10B and stored. Then, the obtained position information is compiled and output.

According to related art, which banner or text is clicked or which icon is selected has been only analyzed. On the other hand, according to this embodiment, information about not only which image object is selected but also which position is touched on the selected image object is collected, and therefore the mode of operation on the image object can be acquired in detail. As a result, it is possible to accurately grasp the mode of operation on the web page in the terminal 20B that receives a touch input (for example, tapping). It is thereby possible to change the shape, size, design, layout and the like of the image object based on the grasped mode of operation and provide a more user-friendly web page to a user.

Further, because the setting of the detectable range and the generation of the position information can be made using the JavaScript or HTML specification, it is possible to build the web system 1 in a short period of time.

Further, in this embodiment, because the selected position is represented by two-dimensional coordinates, it is possible to grasp the mode of operation on the image object in detail.

Fourth Embodiment

Figure 21:
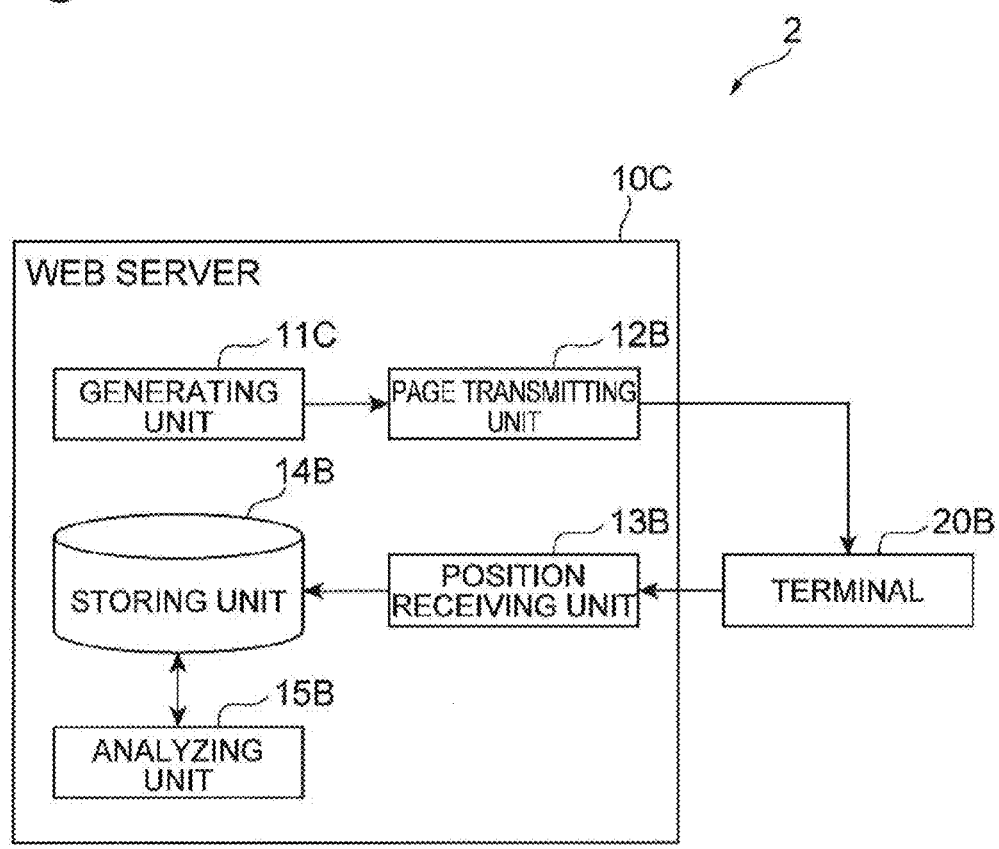
FIG. 21 is a diagram showing a functional configuration of a web server according to a fourth embodiment.
Figure 22:
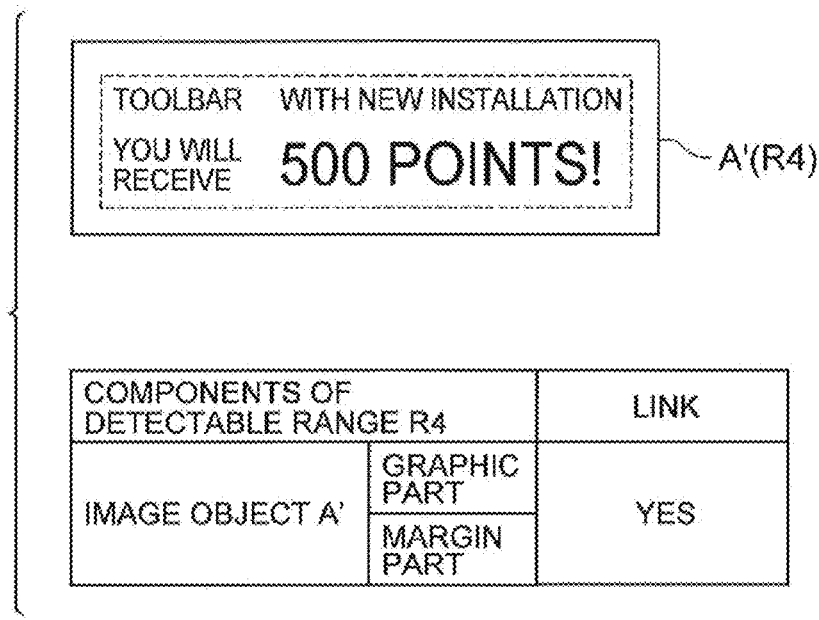
FIG. 22 is a diagram showing an example of setting of a detectable range.

A web system 2 according to a second embodiment is described hereinafter with reference to FIGS. 21 and 22. The second embodiment is different from the third embodiment in that the functions related to the detectable range are implemented using HTML (HyperText Markup Language) specification only without using JavaScript (trademark or registered trademark). Thus, the web system 2 includes a web server 10C. As shown in FIG. 21, the web server 10C is different from the web server 10B in that it includes a generating unit 11C in place of the generating unit 11B. The configurations of the terminal 20B and the communication network N and the functional components of the web server other than the generating unit 11C are the same as those of the first embodiment, and therefore description of those is omitted, and only differences from the first embodiment are described hereinbelow.

The generating unit 11C generates a web page in accordance with a request signal transmitted from the terminal 20B in response to a user's operation and outputs the generated web page to the page transmitting unit 12B. FIG. 22 shows an example of the web page generated by the generating unit 11C. The image object A' shown in FIG. 22 has a margin outside a graphic part, and the boundary between the graphic part and the margin is indicated by a dotted line in FIG. 22. A link is embedded in the image object A'. The whole range of the image object A' is set as a detectable range R4. In this manner, a margin part needs to be an image object in this embodiment.

The image object A' is implemented as a button using an image. The button can be implemented by the code "<input type="image"...". Accordingly, by the HTML specification, when the image object is tapped, the coordinates indicating the position of the tapping can be acquired.

As described above, by implementing the functions related to the detectable range by using the HTML specification only, the present invention can be applied to the environment where the use of JavaScript (trademark or registered trademark) is restricted or inhibited. In this embodiment, the same effects as in the third embodiment can be obtained as a matter of course.

Fifth Embodiment

Figure 23:
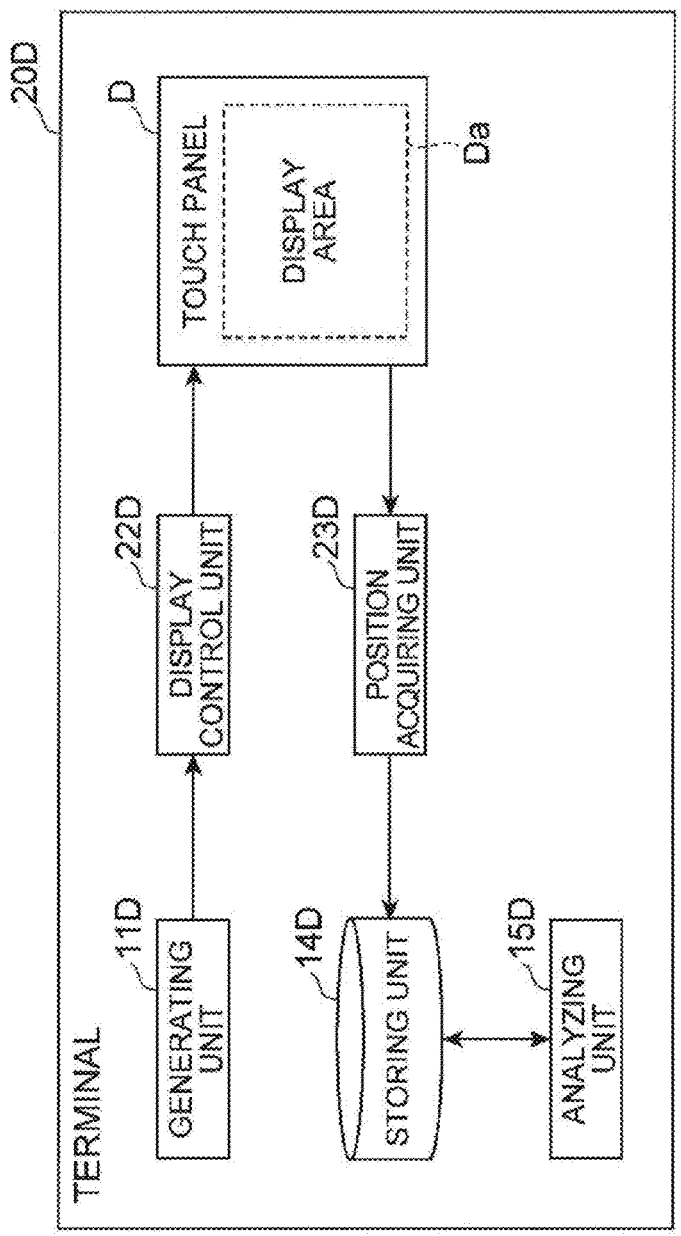
FIG. 23 is a block diagram showing a functional configuration of a terminal according to the third embodiment.

A terminal 20D according to a fifth embodiment is described hereinafter with reference to FIG. 23. The terminal 20D in the fifth embodiment can serve as the web management device according to the present invention.

The terminal 20D has a touch panel D and includes a generating unit 11D (generating means), a storing unit 14D (storing means), an analyzing unit 15D (adjusting means), a display control unit 22D, and a position acquiring unit 23D (acquiring unit) as functional components.

The generating unit 11D generates a web page to be displayed in the display area Da of the touch panel D. The generation process of a web page is the same as the generation process in the generating unit 11B according to the third embodiment. Note that the generating unit 11D may acquire the image object A from a web server which is not shown in FIG. 23 and perform only the setting of the detectable range as the setting of a web page.

The display control unit 22D is a means of controlling display so that the web page that is input from the generating unit 11D is displayed on the touch panel D. The web page is thereby displayed in the display area Da of the touch panel D.

The position acquiring unit 23D has the same function as the position acquiring unit 23B in FIG. 18. Specifically, the position acquiring unit 23D acquires the position of physical contact with the web page displayed in the display area Da and stores position information indicating the position into the storing unit 14D.

The storing unit 14D and the analyzing unit 15D have the same functions as the storing unit 14B and the analyzing unit 15B in FIG. 12, respectively.

As described above, according to this embodiment, the detectable range for detecting the position of physical contact with an image object is embedded in a web page and displayed in the display area Da. After that, when physical contact occurs within the detectable range, the contact position is stored as position information into the storing unit 14D. Then, the obtained position information is compiled and output.

The embodiments of the present invention are described in detail above. However, the present invention is not restricted to the above-described embodiments, and various changes and modifications may be made without departing from the scope of the invention.

Although the detectable range is set for an image object (banner) in the third to fifth embodiments described above, the detectable range may be set for another object. For example, the detectable range may be set for another type of image object such as an icon or a user interface component such as a button. Further, it is not essential to embed a link to another web page in an object. For example, the detectable range may be set for an object that performs a specified operation without switching a web page when clicked.

Although the selected position is represented by the two-dimensional coordinates in the third to fifth embodiments described above, a method of representing the selected position is not limited thereto. For example, the detectable range may be virtually divided into a plurality of blocks, a block ID (identifier) that identifies a block may be assigned to each block, and the selected position may be indicated by the block ID.

In this case, the two-dimensional coordinates indicating the position of tapping and the range of each block are compared, and a code to decide the block ID of the position is embedded in a web page. Further, the position information contains the image ID and the block ID. In this case also, the analysis of the position information can be made in the same manner as in the above-described embodiments, and therefore an administrator of the web server can grasp the mode of operation for each block. Note that a method of setting blocks is arbitrary. For example, the detectable range may be divided equally or blocks may be partitioned for design parts (for example, one phase or one set of graphics) according to the design of the image object.

By representing the selected position with the block ID, the tendency of the mode of operation can be easily grasped. For example, the phenomenon that tapping is unevenly distributed in a specific region, graphic or phrase can be easily grasped.

Although the analyzing units 15B and 15D compile the position information as it is in the above-described embodiments, a compilation method is not limited thereto. For example, an outputting means may associate the selected position with user's attributes (age, gender etc.) to thereby perform compilation by taking user attributes into account.

In this case, the terminal generates position information containing a user ID, an image ID and information indicating a selected position (two-dimensional coordinates or a block ID) and transmits the position information to the web server. The web server further includes a user database that stores user information that can be identified by a user ID. Then, the outputting means associates the position information stored in the storing means with the user information in the user base to thereby perform compilation for each user attribute.

By performing compilation in consideration of user attributes, it is possible to achieve complex or multifaceted analysis of the mode of terminal operation with user attributes taken into account.

Although the system on the server side is composed of one web server 10B or 10C in the third and fourth embodiments described above, the functions of the web server may be distributed among a plurality of servers. For example, it is not always necessary to incorporate the storing unit 14B and the analyzing unit 15B into the web server 10B, and a server for transmitting a page and a server for performing compilation (a server including the storing unit 14B and the analyzing unit 15B) may be separated.

Although the touch panel D is described as the input device of the terminal 20, 20A, 20B and 20D, the type of the input device is not limited thereto.

Hereinafter, the technical ideas extracted from the embodiments of the web management device according to the present invention described above are listed below, pursuant to a description form of claims. The technical ideas according to the present invention can be understood at different levels and as various variations from the superordinate concept to the subordinate concept, and therefore the following description does not limit the present invention.

(Item 1) A web server capable of communicating with a terminal including an input device for displaying a web page containing an object in a display area and detecting physical contact with the display area, comprising:

a generating means for generating the web page with an embedded detectable range for acquiring a position of physical contact with the object displayed in the display area;

a transmitting means for transmitting the web page generated by the generating means to the terminal;

a receiving means for receiving position information indicating a selected position from the terminal having displayed the web page transmitted by the transmitting means in the display area and acquired a position of physical contact made within the detectable range of the web page as the selected position of the object corresponding to the range;

a storing means for storing the position information received by the receiving means; and an outputting means for compiling the position information stored in the storing means and outputting a compilation result.

In the web server according to the above Item 1, the detectable range for detecting the position of physical contact with an image object is embedded in a web page, transmitted to the terminal and displayed thereon. After that, when physical contact occurs within the detectable range, the contact position is transmitted as the selected position (position information) of the object from the terminal to the web server and stored therein. Then, the obtained information is compiled and output. In this manner, by collecting not only information that an object is selected but also information as to at which position the selection of the object is made, the mode of operation on the object in the web page can be acquired in detail. As a result, it is possible to accurately grasp the mode of operation on the web page in the terminal that receives a touch input.

(Item 2) A web server capable of communicating with a terminal including an input device for displaying a web page in a display area and detecting physical contact with the display area, comprising:

an acquiring means for acquiring operation information indicating an operation from the terminal having detected the operation by a user on a first web page displayed in the display area based on physical contact with the display area;

a storing means for storing the operation information acquired by the acquiring means;

an adjusting means for adjusting a second web page to be displayed in the display area based on the operation information stored in the storing means; and a transmitting means for transmitting the second web page adjusted by the adjusting means to the terminal.

In the web server according to the above Item 2, the operation information indicating an operation by a user on the terminal is acquired, and a web page to be displayed in the display area of the terminal is adjusted based on the acquired operation information. The adjusted web page is then transmitted to the terminal. Because the web page is adjusted in this manner, the tendency of the user's operation is reflected on the web page. It is thus possible to provide the web page suitable for the tendency of the user's operation.

INDUSTRIAL APPLICABILITY

As described above, according to the embodiments, because not only information that an object is selected but also information as to at which position the selection of the object is made is collected, it is possible to provide a web management device that can accurately grasp the mode of operation on a web page in a terminal that receives a touch input and provide a user interface suitable for the tendency of the user's operation.

REFERENCE SIGNS LIST

D . . . touch panel, Da . . . display area, $M_{W1}$~$M_{W4}$ . . . virtual region, P1, P1B . . . web management program, P10, P10B . . . main module, P11 . . . acquiring module, P11B . . . generating module, P12 . . . storing module, P12B . . . page transmitting module, P13 . . . adjusting module, P13B . . . position receiving module, P14 . . . web page storing module, P14B . . . storing module, P15 . . . transmitting module, P15B . . . analyzing module, 1, 2 . . . web system, 10, 10B, 10C . . . web server, 11, 11A . . . acquiring unit, 11B, 11C, 11D . . . generating unit, 12, 12A . . . storing unit, 12B . . . page transmitting unit, 13, 13A . . . adjusting unit, 13B . . . position receiving unit, 14 . . . web page storing unit, 14B, 14D . . . storing unit, 15 . . . transmitting unit, 15B, 15D . . . analyzing unit, 20, 20A, 20B, 20D . . . terminal, 21 . . . receiving unit, 21A . . . web page acquiring unit, 21B . . . page acquiring unit, 22, 22A, 22B, 22D . . . display control unit, 23, 23A . . . detecting unit, 23B, 23D . . . position acquiring unit, 24 . . . operation information transmitting unit, 24B . . . position transmitting unit

The invention claimed is:

1. A web management device configured to display a web page containing a plurality of objects in a display area of an input device having the display area and detecting physical contact with the display area, comprising:

at least one memory operable to store program code;

at least one processor operable to read the program code and operate as instructed by the program code, the program code including:

generating code configured to cause the at least one processor to generate the web page with a plurality of embedded detectable ranges for acquiring a position of physical contact with the corresponding plurality of objects respectively, displayed in the display area;

acquiring code configured to cause the at least one processor to acquire a position of physical contact made within at least one of the plurality of detectable ranges of the web page generated by the generating code and displayed in the display area as a selected position of at least one of the plurality of objects corresponding to the at least one of the plurality of detectable ranges, and acquire position information indicating the selected position;

code configured to cause the at least one processor to store the position information acquired by the acquiring code into a memory; and adjusting code configured to cause the at least one processor to adjust a layout of the plurality of objects in the display area based on deviation of the selected position from the center of the at least one of the plurality of detectable ranges, indicated by the position information stored in the memory, in a region where selection made on the at least one of the plurality of objects is detectable, wherein the acquiring code causes the at least one processor to acquire operation information indicating an operation by a user on a first web page displayed in the display area based on the position information, the web management device further comprises code configured to cause the at least one processor to store the operation information acquired by the acquiring code into the memory, and the adjusting code causes the at least one processor to adjust a second web page to be displayed in the display area based on the operation information stored in the memory.

2. The web management device according to claim 1, wherein each the plurality of detectable ranges are composed of a region of the corresponding plurality of objects and a peripheral region of the region.

3. The web management device according to claim 2, wherein a link to another web page is embedded in both of the plurality of objects and the peripheral region.

4. The web management device according to claim 1, wherein an outer edge of the plurality of objects is a margin.

5. The web management device according to claim 1, wherein the selected position is represented by two-dimensional coordinates.

6. The web management device according to claim 1, wherein each of the plurality of objects is virtually divided into a plurality of blocks, and the selected position is represented by an identifier of the block.

7. The web management device according to claim 1, wherein each of the plurality of objects contains a character, a virtual region is set in each of the plurality of objects for each region where a character, a phase composed of a plurality of characters, or a sentence is displayed, and the selected position is represented by an identifier indicating the virtual region.

8. The web management device according to claim 1, wherein the input device is a touch panel.

9. The web management device according to claim 1, wherein the operation information contains information related to a selected position in a region where selection made on an object displayed on the first web page is detectable, and the adjusting code causes the at least one processor to adjust a layout of objects contained in the second web page based on the information related to the selected position.

10. The web management device according to claim 9, wherein the operation information contains information related to deviation of a selected position in the region where selection made on the object is detectable, and the adjusting code causes the at least one processor to place selectable objects contained in the second web page in a specified region set in accordance with a direction of the deviation in the display area.

11. The web management device according to claim 1, wherein the operation information is stored into the memory on a user-by-user basis, and the adjusting code causes the at least one processor to adjust the second web page on a user-by-user basis.

12. The web management device according to claim 1, wherein the adjusting code is configured to adjust at least one of graphic parts of the plurality of objects in the display area and the detectable range.

13. A web management device configured to display a web page containing a plurality of objects in a display area of an input device having the display area and detecting physical contact with the display area, comprising:

at least one memory operable to store program code;

at least one processor operable to read the program code and operate as instructed by the program code, the program code including:

generating code configured to cause the at least one processor to generate a web page with a plurality of embedded detectable ranges for acquiring a position of physical contact with the corresponding plurality of objects respectively, displayed in the display area;

acquiring code configured to cause the at least one processor to acquire a position of physical contact made within at least one of the plurality of detectable ranges of the web page generated by the generating code and displayed in the display area as a selected position of at least one of the plurality of objects corresponding to the at least one of the plurality of detectable ranges, and acquire position information indicating the selected position;

code configured to cause the at least one processor to store the position information acquired by the acquiring code into a memory; and adjusting code configured to cause the at least one processor to adjust an attribute value related to an amount of movement of display contents with respect to the scrolling in the web page, wherein the acquiring code causes the at least one processor to acquire operation information containing information related to scrolling of a first web page, the information related to scrolling of the first web page including at least one of the number of scrolling operation and the moving speed of the contact position, and the adjusting code causes the at least one processor to adjust the attribute value of a second web page related to the amount of movement of display contents based on the acquired operation information.

14. A web management method executed by a web management device, including at least one processor, configured to display a web page containing a plurality of objects in a display area of an input device having the display area and detecting physical contact with the display area, the method comprising:

generating, using said processor, the web page with a plurality of embedded detectable ranges for acquiring a position of physical contact with the corresponding plurality of objects respectively, displayed in the display area;

acquiring, using said processor, a position of physical contact made within at least one of the plurality of detectable ranges of the generated web page and displayed in the display area as a selected position of at least one of the plurality of objects corresponding to the at least one of the plurality of detectable ranges, and acquiring position information indicating the selected position;
storing, using said processor, the acquired position information into a memory; and
adjusting, using said processor, a layout of the plurality of objects in the display area based on deviation of the selected position from the center of the at least one of the plurality of detectable ranges, indicated by the position information stored in the memory, in a region where selection made on the at least one of the plurality of objects is detectable, wherein
the web management method further comprises:
acquiring operation information indicating an operation by a user on a first web page displayed in the display area based on the position information, and
storing the acquired operation information into the memory, and
the adjusting comprises adjusting a second web page to be displayed in the display area based on the operation information stored in the memory.

15. A non-transitory computer readable recording medium for recording a web management program causing a computer to function as a web management device configured to display a web page containing a plurality of objects in a display area of an input device having the display area and detecting physical contact with the display area, the web management program causing the computer to:
generate the web page with a plurality of embedded detectable ranges for acquiring a position of physical contact with the corresponding plurality of objects respectively, displayed in the display area;
acquire a position of physical contact made within at least one of the plurality of detectable ranges of the web page generated by the generating function and displayed in the display area as a selected position of at least one of the plurality of objects corresponding to the at least one of the plurality of detectable ranges, and acquire position information indicating the selected position;
store the position information acquired by the acquiring function into a memory; and
adjust a layout of the plurality of objects in the display area based on deviation of the selected position from the center of the at least one of the plurality of detectable ranges, indicated by the position information stored in the memory, in a region where selection made on the at least one of the plurality of objects is detectable, wherein
the web management program further causes the computer to:
acquire operation information indicating an operation by a user on a first web page displayed in the display area based on the position information,
store the operation information acquired by the acquiring code into the memory, and
adjust a second web page to be displayed in the display area based on the operation information stored in the memory.

16. A web system including a terminal having an input device for displaying a web page containing a plurality of objects in a display area and detecting physical contact with the display area, and a web server, including at least one processor, configured to communicate with the terminal, the web server comprising:

at least one memory operable to store program code;
at least one processor operable to read the program code and operate as instructed by the program code, the program code including:
generating code configured to cause the at least one processor to generate the web page with a plurality of embedded detectable ranges for acquiring a position of physical contact with the corresponding plurality of objects respectively, displayed in the display area;
transmitting code configured to cause the at least one processor to transmit the web page generated by the generating code to the terminal;
acquiring code configured to cause the at least one processor to acquire position information indicating a selected position from the terminal having displayed the web page transmitted by the transmitting code in the display area and acquired a position of physical contact made within at least one of the plurality of detectable ranges of the web page as the selected position of at least one of the plurality of objects corresponding to the at least one of the plurality of detectable ranges;
storing code configured to cause the at least one processor to store, in a memory the position information acquired by the acquiring code; and
adjusting code configured to cause the at least one processor to adjust a layout of the plurality of objects in the display area based on deviation of the selected position from the center of the at least one of the plurality of detectable ranges, indicated by the position information stored in the memory, in a region where selection made on the at least one of the plurality of objects is detectable, wherein
the acquiring code causes the at least one processor to acquire operation information indicating an operation by a user on a first web page displayed in the display area based on the position information,
the web management device further comprises code configured to cause the at least one processor to store the operation information acquired by the acquiring code into the memory, and
the adjusting code causes the at least one processor to adjust a second web page to be displayed in the display area based on the operation information stored in the memory.

17. A web management method executed by a web management device, including at least one processor, configured to display a web page containing a plurality of objects in a display area of an input device having the display area and detecting physical contact with the display area, the method comprising:
generating a web page with a plurality of embedded detectable ranges for acquiring a position of physical contact with the corresponding plurality of objects respectively, displayed in the display area;
acquiring a position of physical contact made within at least one of the plurality of detectable ranges of the web page generated by the generating code and displayed in the display area as a selected position of at least one of the plurality of objects corresponding to the at least one of the plurality of detectable ranges, and acquire position information indicating the selected position;
storing the position information acquired by the acquiring code into a memory; and
adjusting an attribute value related to an amount of movement of display contents with respect to the scrolling in the web page, wherein the method further comprises acquiring operation information containing information related to scrolling of a first web page, the information related to scrolling of the first web page including at least one of the number of scrolling operation and the moving speed of the contact position, and the adjusting comprises adjusting the attribute value of a second web page related to the amount of movement of display contents based on the acquired operation information.

* * * * *